(12) United States Patent
Matsumoto et al.

(10) Patent No.: US 8,495,331 B2
(45) Date of Patent: Jul. 23, 2013

(54) STORAGE APPARATUS AND STORAGE MANAGEMENT METHOD FOR STORING ENTRIES IN MANAGEMENT TABLES

(75) Inventors: Shinya Matsumoto, Yokohama (JP); Yohsuke Ishii, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 230 days.

(21) Appl. No.: 13/054,045

(22) PCT Filed: Dec. 22, 2010

(86) PCT No.: PCT/JP2010/007429
§ 371 (c)(1),
(2), (4) Date: Jan. 13, 2011

(87) PCT Pub. No.: WO2012/085968
PCT Pub. Date: Jun. 28, 2012

(65) Prior Publication Data
US 2012/0166751 A1    Jun. 28, 2012

(51) Int. Cl.
*G06F 12/06* (2006.01)
(52) U.S. Cl.
USPC ............ 711/170; 711/152; 711/156; 711/163
(58) Field of Classification Search
USPC .................................. 711/152, 156, 163, 170
See application file for complete search history.

(56) References Cited

U.S. PATENT DOCUMENTS

| | | | |
|---|---|---|---|
| 5,713,013 A | 1/1998 | Black | |
| 8,099,551 B2 * | 1/2012 | Kobayashi et al. | 711/114 |
| 2002/0023156 A1 | 2/2002 | Chujo et al. | |
| 2003/0225981 A1 * | 12/2003 | Castelli et al. | 711/147 |
| 2004/0030668 A1 | 2/2004 | Pawlowski et al. | |
| 2005/0044198 A1 | 2/2005 | Okitsu et al. | |
| 2005/0066134 A1 * | 3/2005 | Tormasov et al. | 711/151 |
| 2007/0150690 A1 * | 6/2007 | Chen et al. | 711/170 |
| 2007/0266218 A1 | 11/2007 | Achiwa | |
| 2008/0172428 A1 * | 7/2008 | Stokes | 707/205 |
| 2011/0264868 A1 * | 10/2011 | Takata et al. | 711/154 |
| 2012/0011336 A1 * | 1/2012 | Saika | 711/162 |

FOREIGN PATENT DOCUMENTS

| | | |
|---|---|---|
| JP | 2005-056011 | 3/2005 |
| JP | 2005-535961 | 11/2005 |

OTHER PUBLICATIONS

PCT International Search Report and Written Opinion on application PCT/JP2010/007429 mailed Jul. 28, 2011; 12 pages.

* cited by examiner

*Primary Examiner* — John Lane
(74) *Attorney, Agent, or Firm* — Foley & Lardner LLP

(57) ABSTRACT

A storage apparatus is connected via a network to a plurality of host computers requesting data writing. The storage apparatus includes: a volume creation unit for creating virtual volumes to be accessed by the host computers; an allocation unit for allocating a storage area of the storage apparatus to a data storage area of the virtual volumes in response to a data write request from the host computers; and a capacity management unit for managing the capacity of data written from the host computers; wherein the capacity management unit adds the data written from the host computers with regard to each host computer and judges whether a total value of the added data exceeds a specified threshold or not.

6 Claims, 28 Drawing Sheets

FIG. 7

| FILE SYSTEM ID | LU |
|---|---|
| 00 | 00 |
| 01 | 01 |
| 01 | 02 |
| 02 | 03 |
| ... | ... |

| LUN | LU SIZE | ID | USED CAPACITY |
|---|---|---|---|
| 00 | 20GB | foo.com | 5GB |
| 01 | 300GB | foo.com | 35GB |
| 01 | 300GB | bar.net | 20GB |
| 02 | 20GB | bar.net | 30GB |
| 03 | 100GB | NONE | 0GB |
| ... | ... | ... | ... |

| ID | TOTAL USED CAPACITY | THRESH- OLD | NOTIFI- CATION | WHERE REPORT TO | WRITE |
|---|---|---|---|---|---|
| foo.com | 40GB | 50GB | SNMP | NONE | ALLOW |
| bar.net | 50GB | 100GB | MAIL | admin@bar.net | ALLOW |
| Hoge.ne.jp | 0GB | 10GB | NONE | NONE | FORBID |
| ... | ... | ... | ... | ... | ... |

1014

10140  10141  10142  10143  10144  10145

F I G. 27

| ID | AUTHENTICATION SERVER | SERVER ID |
|---|---|---|
| foo.com | 192.168.10.10 | john |
| bar.net | 192.168.10.20 | smith |
| hoge.ne.jp | 192.168.10.30 | yamada |
| ... | ... | ... |

STORAGE APPARATUS AND STORAGE MANAGEMENT METHOD FOR STORING ENTRIES IN MANAGEMENT TABLES

TECHNICAL FIELD

The present invention relates to a storage apparatus and a storage management method. Particularly, this invention is suited for use in a storage apparatus handling block accesses and file accesses.

BACKGROUND ART

With scale expansion and complication of a storage environment due to an increase of company data, thin provisioning that utilizes virtual volumes (hereinafter sometimes referred to as the virtual volumes), which themselves do not have storage areas, has been widely used for the purpose of facilitation of operation management and integration of the storage environment.

The thin provisioning presents virtual volumes to a host computer; and when the host computer makes write access to a virtual volume, a physical storage area for actually storing data is allocated to the virtual volume. Therefore, it is possible to efficiently use storage areas in a storage apparatus, while presenting the volumes, whose capacity is not less than that of the storage areas in the storage apparatus, to the host computer.

Specifically speaking, the thin provisioning defines one or more logical volumes in the storage areas provided by one or more hard disk devices (HDDs: Hard Disk Drives). Moreover, one or more logical volumes constitute one storage pool and one or more virtual volumes are associated with each storage pool. When the host computer makes write access to a virtual volume, a specified size unit of the storage area (the storage area of this size will be hereinafter referred to as the page) is allocated from any of the logical volumes in the storage pool associated with that virtual volume to the relevant segment of the write-accessed virtual volume.

Furthermore, Patent Literature 1 discloses a computer system in which objects in a file system, to which block access can be made, and a virtualization module that cooperates with the file system in order to manage the objects, are provided in a storage apparatus handling both file accesses and block accesses. Patent Literature 1 describes that virtual volumes for operating databases and virtual volumes for operating the file system can be managed integrally by one storage apparatus. Particularly, a storage administrator can set a capacity limitation value for each virtual volume, each directory in the file system, or each user.

Furthermore, Patent Literature 2 discloses integrated capacity management of the entire computer system by executing capacity limitation processing (quota limitation processing) in a plurality of file systems in cooperation with each other, while such capacity limitation processing has been executed in only one file system in the conventional art.

CITATION LIST

Patent Literature
PTL 1: US Patent Publication No. 2004/0030668
PTL 2: US Patent Publication No. 2005/0044198

SUMMARY OF INVENTION

Technical Problem

However, the thin provisioning presents the virtual volumes, whose capacity is not less than that of storage areas in the storage apparatus, to the host computer as described above. Accordingly, a necessary capacity is allocated from the storage pool the host computer until the allocated capacity reaches a capacity (virtual volume size) which is set in advance for each virtual volume presented to the host computer. As a result, there is a problem in that a quota limitation of the file system cannot be used on the virtual volumes which are not operated by the file system; and when a plurality of host computers are connected to the storage apparatus, there is a possibility that some host computer(s) may exclusively use the capacity of the storage pool.

The present invention was devised in light of the circumstances described above and the invention aims at suggesting a storage apparatus and storage management method capable of easily setting capacity limitations on the virtual volumes.

Solution to Problem

In order to solve the above-described problems, a storage apparatus connected via a network to a plurality of host computers requesting data writing is provided according to the present invention, wherein the storage apparatus includes a volume creation unit for creating virtual volumes to be accessed by the host computers, an allocation unit for allocating a storage area of the storage apparatus to a data storage area of the virtual volumes in response to a data write request from the host computers, and a capacity management unit for managing the capacity of data written from the host computers; and wherein the capacity management unit adds the data written from the host computers with respect to each host computer and judges whether a total value of the added data exceeds a specified threshold or not.

When the host computer creates virtual volumes and writes data, the above-described configuration is designed so that the data written from the host computer are added with respect to each host computer and whether the total value of the added data exceeds a specified threshold or not is judged. As a result, it is possible to manage the capacity flexibly and easily according to the expansion or downsizing of company business by setting a value of the virtual volume size, which is a value considerably larger than an actual used capacity, as in the conventional art, and using a newly set threshold.

Advantageous Effects of Invention

Accordingly to the present invention, capacity limitations on virtual volumes can be set easily.

BRIEF DESCRIPTION OF DRAWINGS

FIG. 7 is a chart showing an example of a file system management table according to the first embodiment.

FIG. 9 is a chart showing an example of a volume used capacity management table according to the first embodiment.

FIG. 11 is a chart showing an example of a storage used capacity management table according to the first embodiment.

FIG. 27 is a chart showing an example of a user ID conversion table according to a second embodiment.

DESCRIPTION OF EMBODIMENTS

An embodiment of the present invention will be explained in detail with reference to the attached drawings.

(1) First Embodiment (1-1) Outline of this Embodiment

Firstly, the outline of this embodiment will be explained with reference to FIG. 1. With large-scale expansion and complication of a storage environment due to an increase of enterprise data, thin provisioning that utilizes virtual volumes (hereinafter sometimes referred to as the virtual volumes), which themselves do not have storage areas, has been widely used for the purpose of facilitation of operation management and integration of the storage environment.

The thin provisioning presents virtual volumes to a host computer; and when the host computer makes write access to a virtual volume, a physical storage area for actually storing data is allocated to the virtual volume. Therefore, it is possible to efficiently use storage areas in a storage apparatus, while presenting the volumes, whose capacity is not less than that of the storage areas in the storage apparatus, to the host computer.

Specifically speaking, the thin provisioning defines one or more logical volumes in the storage areas provided by one or more hard disk devices. Moreover, one or more logical volumes constitute one storage pool and one or more virtual volumes are associated with each storage pool. When the host computer makes write access to a virtual volume, a specified size unit of the storage area (the storage area of this size will be hereinafter referred to as the page) is allocated from any of the logical volumes in the storage pool associated with that virtual volume to the relevant segment of the write-accessed virtual volume.

Furthermore, a computer system in which objects in a file system, to which block access can be made, and a virtualization module that cooperates with the file system in order to manage the objects, are provided in a storage apparatus handling both file accesses and block accesses is disclosed recently. The above-described technique can integrally manage virtual volumes for operating databases and virtual volumes for operating the file system by using one storage apparatus. Particularly, a storage administrator can set a capacity limitation value for each virtual volume, each directory in the file system, or each user.

Figure 1:
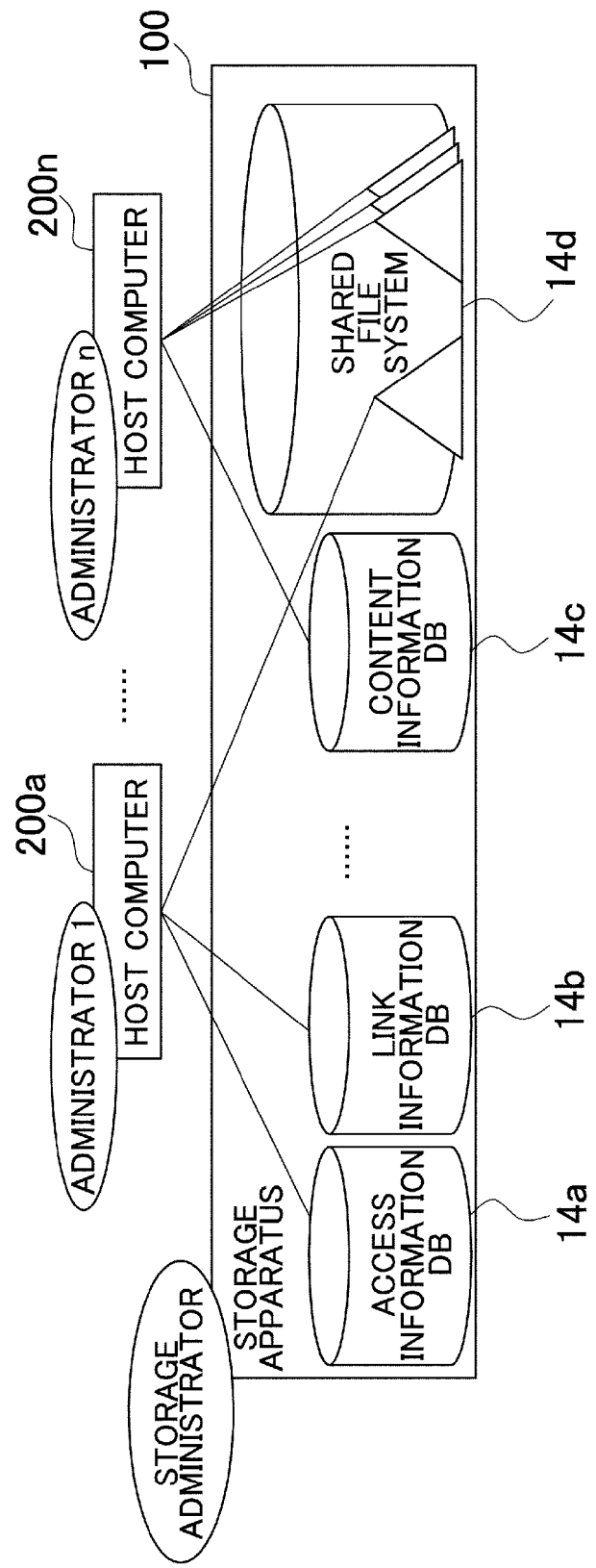
FIG. 1 is a conceptual diagram explaining the outline of a computer system according to a first embodiment of the present invention.

For example, when a plurality of host computers 200a and so on up to 200n (hereinafter sometimes referred to as the host computer 200) are connected to a storage apparatus 100 as shown in FIG. 1 and data is written from the host computer 200a by means of the above-described thin provisioning, a storage pool capacity is allocated according to an amount of the written data. Therefore, if a large amount of data is written from the host computer 200a, it is possible that the host computer 200a may exclusively use the capacity of the storage pool.

A storage administrator of the storage apparatus 100 sets the size of virtual volumes to be presented to the host computer 200. When a plurality of host computers 200 are connected to the storage apparatus 100, the virtual volume size is set for each of the host computers 200. The virtual volume size herein means a maximum possible size of the capacity that can be allocated from the storage pool to the virtual volume in an environment using the thin provisioning. When data is written from the host computer 200 as described above, the storage apparatus 100 does not have to guarantee that it has a sufficient capacity for the virtual volume size in the storage pool in order to allocate an actual storage area of the storage pool to the virtual volumes. The storage administrator manages the capacity of the storage apparatus 100 by adding a hard disk device(s) before there will be no more capacity to be allocated to the virtual volumes.

Since the thin provisioning presents the virtual volumes whose capacity is not less than the storage area of the storage apparatus as described above, a necessary capacity is allocated from the storage pool until the allocated capacity reaches the capacity (virtual volume size) set in advance for each virtual volume presented to the host computer.

Regarding virtual volumes operated by the file system, the used capacity can be limited for each directory by using a quota function of the file system. On the other hand, regarding virtual volumes not operated by the file system, the capacity limitation cannot be managed separately from the virtual volume size. Therefore, when a plurality of host computers 200 are connected to the storage apparatus, there is a possibility that some host computer(s) 200 may exclusively use the capacity of the storage pool.

So, according to this embodiment, a threshold for the capacity that can be allocated to the host computer 200 or a user who is an administrator of the host computer 200 can be set separately from the above-mentioned virtual volume size. As a result, while keeping the virtual volume size, which is generally difficult to extend, equal to or more than the size of the storage pool as in the conventional art, it is possible to avoid the exclusive use of the storage pool capacity by a specific host computer 200 by using a newly set threshold to limit one or more virtual volume sizes used by the host computer 200.

Specifically speaking, a threshold for the total used capacity of virtual volumes in the storage apparatus 100 is set for each host computer 200. Then, virtual volumes created in the storage apparatus 100 are associated with the host computer 200 that can use those virtual volumes. The used capacity for the host computer 200 capable of accessing the virtual volumes is managed and the total used capacity of the virtual volumes in the storage apparatus is calculated for each host computer 200. Furthermore, if the total used capacity of the virtual volumes for the host computer 200 exceeds the set threshold, processing for reporting that the total used capacity exceeds the threshold, and limiting data writing is executed.

Furthermore, in a case of file writing, the conventional quota function may be used to tally the used capacity at the time of file access and the used capacity at the time of block access in cooperation with the quota function of the above-described file system.

In this embodiment, a value considerably larger than an actual used capacity is set as the virtual volume size as in the conventional art and a newly set threshold is used so that capacity management can be performed according to, for example, expansion of company business. For example, flexible and easy capacity management can be performed by providing the used capacity threshold for the host computers 200 without setting limitations on volumes and file systems with respect to the host computers 200 using a plurality of volumes and file systems. The virtual volumes will be hereinafter sometimes simply referred to as the volumes.

For example, the storage apparatus 100 according to this embodiment can provide a service for billing the administrator of the host computer 200 in accordance with the set used capacity threshold. Furthermore, when the virtual volumes of the storage apparatus 100 are provided to the user, and if the volume capacity becomes deficient because of the expansion of the user business, the threshold is increased; and if the necessity arises to reduce the volume capacity due to, for example, reduction of expenditure, the threshold is decreased. Accordingly, it is possible to flexibly set the capacity limitation for each host computer 200 or each user without the need for rigorous planning of the used capacity for each volume or each file system.

(1-2) Hardware Configuration of Computer System

Figure 2:
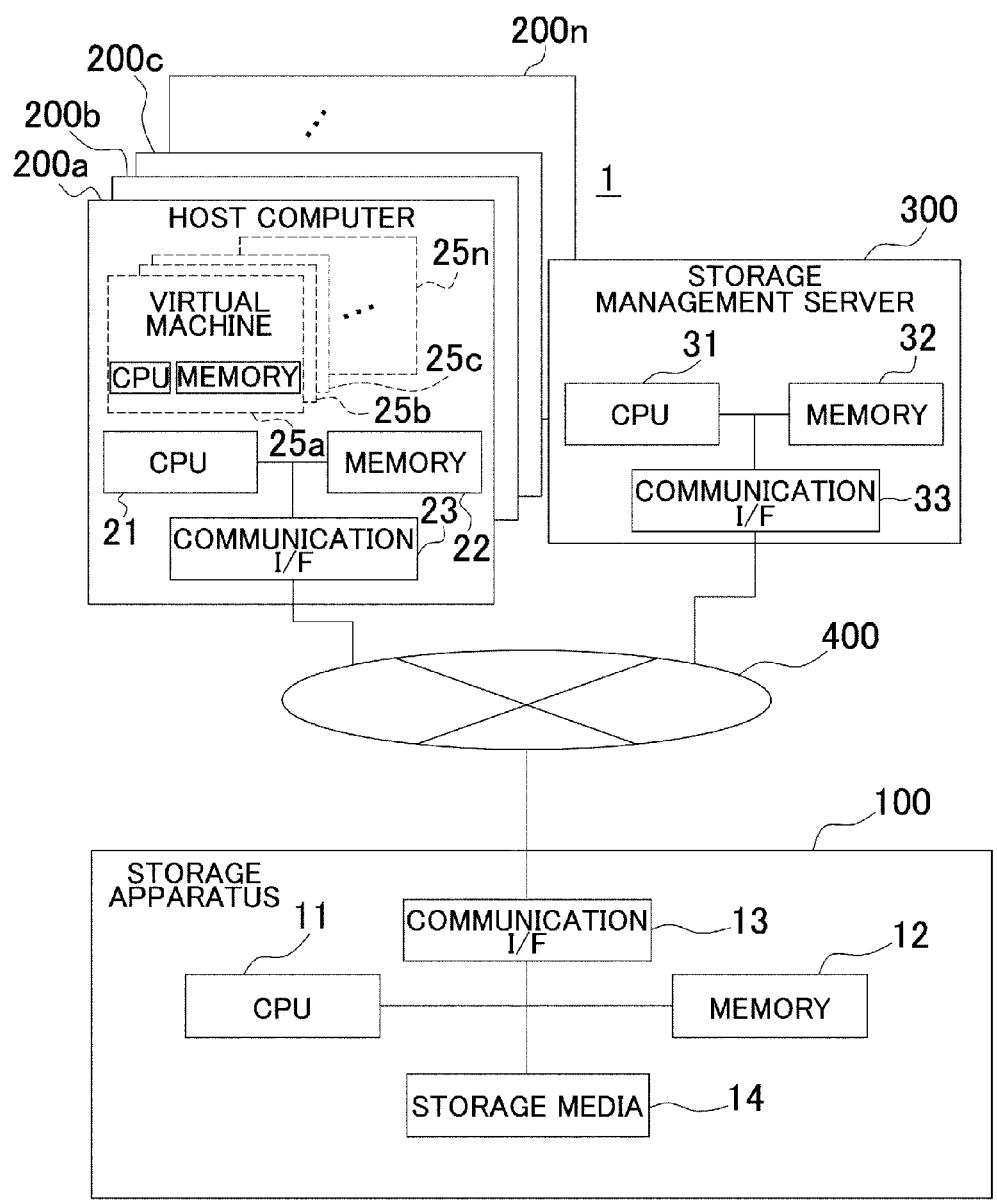
FIG. 2 is a block diagram showing a hardware configuration of the computer system according to the first embodiment.

Next, a hardware configuration of a computer system 1 will be shown. Referring to FIG. 2, the computer system 1 includes the storage apparatus 100, the host computers 200a, 200b, 200c, 200n (hereinafter sometimes referred to as the host computer 200), a storage management server 300, and a network 400.

The storage apparatus 100, the host computer 200, and the storage management server 300 are connected to each other via the network 400. The network 400 may be a LAN (Local Area Network), the Internet, public lines, or private lines. If the network 400 is a LAN, communication between the devices is performed according to a TCP/IP (Transmission Control Protocol/Internet Protocol) protocol. Also, the network 400 may be composed of a SAN (Storage Area Network). If the network 400 is a SAN, communication between the devices is performed according to, for example, a Fibre Channel protocol.

The storage apparatus 100 includes a CPU (Central Processing Unit) 11, a memory 12, a communication I/F 13, and storage media 14 as shown in FIG. 2.

The CPU 11 serves as an arithmetic processing unit and a control device and controls the overall operation in the storage apparatus 100 in accordance with various programs stored in the memory 12. Also, the CPU 11 may be a microprocessor.

The memory 12 stores, for example, programs and arithmetic parameters used by the CPU 11 and is composed of, for example, a ROM (Read Only Memory) or a RAM (Random Access Memory).

The communication I/F 13 is a communication interface composed of, for example, communication devices for connection to the host computer 200 or the storage management server 300 via the network 400. Moreover, the communication I/F 13 may be a wireless LAN-compatible communication device, a wireless USB-compatible communication device, or a wire communication device performing wire communication.

The storage media 14 include a plurality of physical disks. The physical disks are composed of a plurality of hard disk devices, including expensive hard disk devices such as SAS (Serial Attached SCSI) disks or inexpensive hard disk devices such as SATA (Serial Advanced Technology Attachment) disks, or SSDs (Solid State Drives). Furthermore, data of high importance may be stored in a high performance storage tier and data of low importance may be stored in a low performance storage tier, thereby efficiently utilizing various kinds of physical disks with different performance.

Moreover, the storage apparatus 100 is connected to a plurality of host computers 200. The host computer 200 is composed of, for example, an application server used by a plurality of users or a user computer used by one user. Examples of the application server includes a server that operates databases including content information stored in files, and a Web server that operates databases including content information related to, for example, electronic commerce.

The host computer 200 includes a CPU 21, a memory 22, and a communication I/F 23 as shown in FIG. 2.

The CPU 21 serves as an arithmetic processing unit and a control device and controls the overall operation in the host computer 200 in accordance with various programs stored in the memory 22. Also, the CPU 21 may be a microprocessor.

The memory 22 stores, for example, programs and arithmetic parameters used by the CPU 21 and is composed of, for example, a ROM or a RAM.

The communication I/F 23 is a communication interface composed of, for example, communication devices for connection to the storage apparatus 100 or the storage management server 300 via the network 400. Moreover, the communication I/F 23 may be a wireless LAN (Local Area Network)- compatible communication device, a wireless USB-compatible communication device, or a wire communication device performing wire communication.

Furthermore, physical resources (such as the CPU 21 and the memory 22) mounted in the host computer 200 may be virtually divided to constitute a plurality of virtual machines 25a, 25b, 25c and so on up to 25n (hereinafter collectively referred to as the virtual machine 25). The virtual machine 25 is equipped with an OS (Operating System) and various types of software (not shown in the drawing) and the OS in the virtual machine 25 operates by occupying the resources of the virtual machine 25 as if one virtual machine 25 were one physical machine.

The storage management server 300 includes a CPU 31, a memory 32, and a communication I/F 33.

The CPU 31 serves as an arithmetic processing unit and a control device and controls the overall operation in the storage management server 300 in accordance with various programs stored in the memory 32. Also, the CPU 31 may be a microprocessor.

The memory 32 stores, for example, programs and arithmetic parameters used by the CPU 31 and is composed of, for example, a ROM or a RAM.

The communication I/F 33 is a communication interface composed of, for example, communication devices for connection to the storage apparatus 100 or the host computer 200 via the network 400. Moreover, the communication I/F 33 may be a wireless LAN-compatible communication device, a wireless USB-compatible communication device, or a wire communication device performing wire communication.

(1-3) Software Configuration of Computer System

Figure 3:
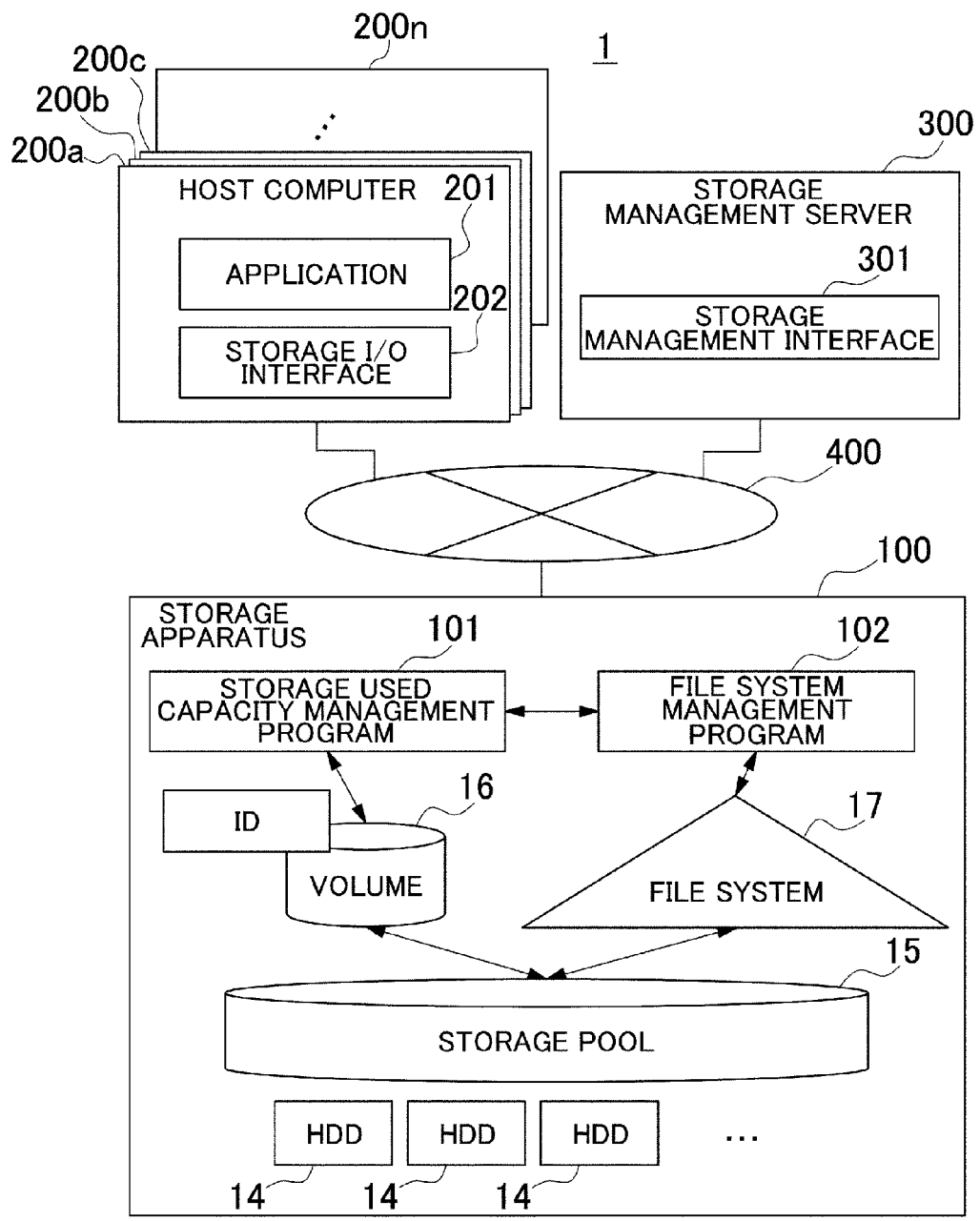
FIG. 3 is a block diagram showing a software configuration of the computer system according to the first embodiment.

Next, a software configuration of the computer system 1 will be explained. FIG. 3 shows the overview of the software configuration of the computer system 1. The host computer 200 is equipped with various applications 201 and accesses the storage apparatus 100 via a storage I/O interface 202. Moreover, the storage management server 300 is a device for managing, for example, volume creation by the storage apparatus 100 according to input by the administrator who manages the storage apparatus 100. The storage apparatus 100 provides virtual volumes to the host computer 200 by means of the thin provisioning as described earlier.

Now, the details of the thin provisioning will be explained. The storage apparatus 100 includes a plurality of storage media 14 as shown in FIG. 3 and the plurality of storage media 14 form a group(s) of physical disks. An example of the physical disk group(s) is RAID (Redundant Arrays of Independent Disks). One or more logical volumes are defined in storage areas provided by the physical disk group(s). One or more logical volumes provided by one or more physical disk groups are managed as one storage pool 15.

Then, one or more virtual volumes 16 (hereinafter simply referred to as the volume 16) or the file system 17 is associated with the storage pool 15. The host computer 200 reads/writes data by accessing the virtual volume 16 or the file system 17 by means of block access or file access. When the host computer 200 makes write access to the virtual volume 16, data is written by designating a block of the virtual volume 16, using a block access protocol such as FC (Fibre Channel), iSCSI (internet Small Computer System Interface), or FCoE (Fibre Channel over Ethernet). Moreover, when the host computer 200 makes write access to the file system 17, data is written to the file system 17 on a file basis by using a file access protocol such as NFS (Network File System), CIFS (Common Internet File System), or HTTP (Hyper Text Transfer Protocol).

The storage apparatus 100 according to this embodiment as described above has the volume 16 and the file system 17 configured in the storage apparatus 100 and is a storage apparatus that can handle both file access and block access from the host computer 200. When creating a new volume 16 by using a storage management interface 301 for the storage management server 300, the administrator of the storage apparatus 100 sets a volume ID for identifying the volume 16. The same ID as that of a user ID set to the file system in advance by a file system management program 102 for managing the file system is set as the volume ID.

A storage used capacity management program 101 integrally manages the capacity used by the volume 16 or the file system 17 in the storage apparatus 100. Specifically speaking, when the host computer 200 makes write access to the volume in the storage apparatus 100, the storage used capacity management program 101 monitors an amount of data written. Also, when the host computer 200 makes write access to the file system in the storage apparatus 100, the file system management program 102 monitors the amount of data written.

The storage used capacity management program 101 then obtains the amount of data written for each user ID from the file system management program 102 and calculates the sum of the amount of data written for each user ID and the amount of data written for each volume ID. The storage used capacity management program 101 then judges whether the total amount of data written exceeds a specified threshold or not; and if the total amount of data written exceeds the threshold, the storage used capacity management program 101 executes processing for notifying the user that the total amount of data written exceeds the threshold, and limiting data writing.

Figure 4:
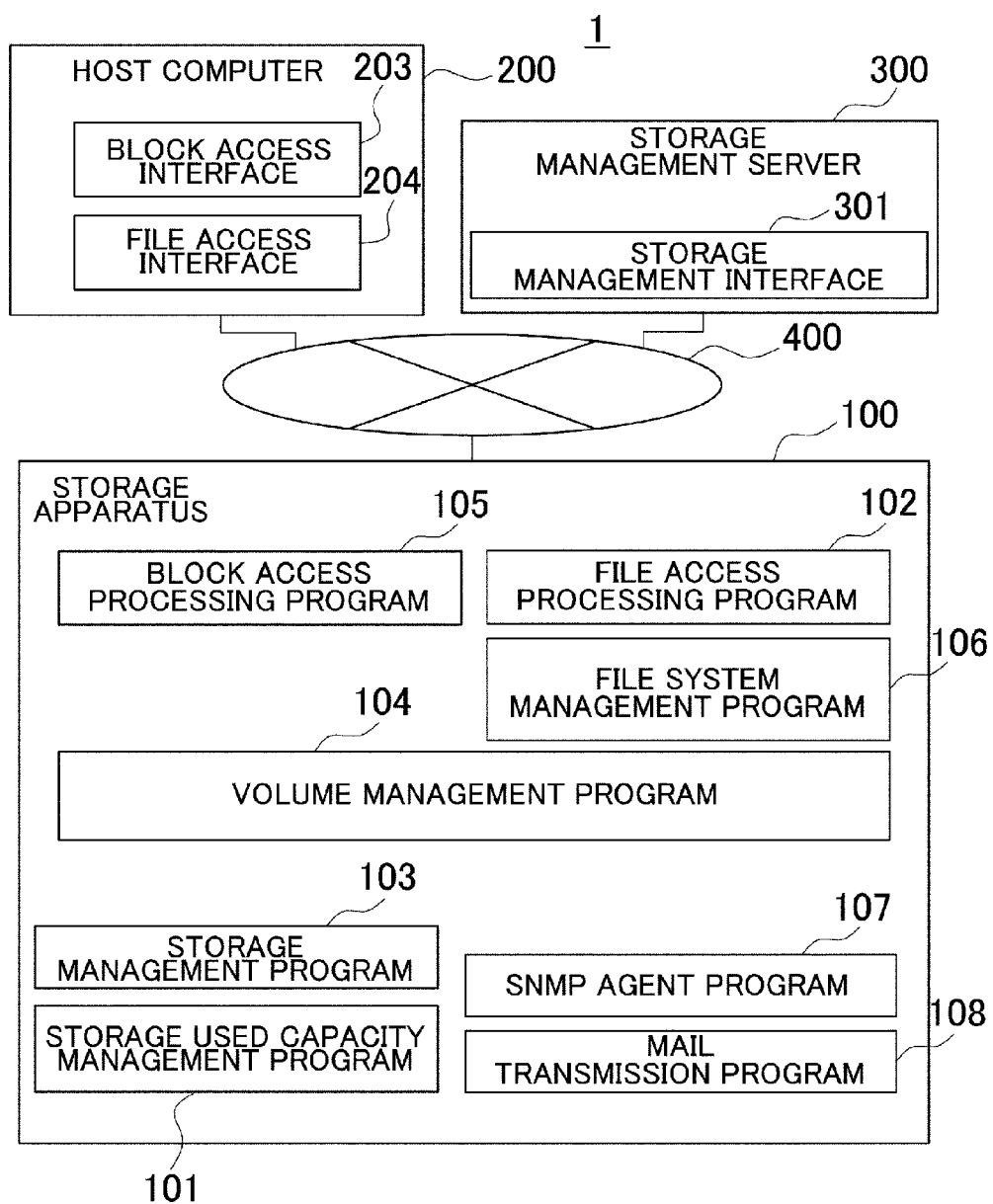
FIG. 4 is a block diagram showing a software configuration of the computer system according to the first embodiment.

Next, the details of the software configuration of the computer system 1 will be explained. The memory 22 for the host computer 200 stores, for example, a block access interface 203 and a file access interface 204 as shown in FIG. 4. The block access interface 203 accesses the storage apparatus 100 by means of block access, while the file access interface 204 accesses the storage apparatus 100 by means of file access.

The memory for the storage apparatus 100 stores the storage used capacity management program 101, the file access processing program 102, a storage management program 103, a volume management program 104, a block access processing program 105, a file system management program 106, an SNMP (Simple Network Management Protocol) agent program 107, and a mail transmission program 108.

The block access processing program 105 is a program for processing block-based access sent from the block access interface 203 for the host computer 200. Blocks are data processing units specified by the communication protocol. For example, the block access processing program 105 executes block-based write processing by using the protocol such as iSCSI or FCoE mentioned earlier.

The file access processing program 102 is a program for processing file-based access sent from the file access interface 204 for the host computer 200. For example, the file access processing program 102 executes file-based write processing by using the protocol such as NFS or CIFS mentioned earlier. However, since a file system is created in virtual volumes, block-based input/output processing is executed after executing input/output processing on the file system.

The storage management program 103 is a program for issuing commands to each program to, for example, create or delete a volume, create or delete a file system, set a specified threshold, and set processing at the time of a threshold excess, based on commands from the storage management interface 301 for the storage management server 300 or commands within the storage apparatus 100.

When, for example, the volume capacity exceeds the threshold or a failure occurs, the SNMP agent program 107 is a program for notifying the storage administrator of information about the failure or similar. For example, the SNMP agent program 107 sends the information via the network 400 to an SNMP management program (not shown in the drawing) for the storage management server 300.

When the volume capacity exceeds the threshold, the mail transmission program 108 is a program for notifying the administrator of the host computer 200 via the network 400 of the threshold excess.

The volume management program 104 is a program for managing the aforementioned storage pool and, for example, creation or deletion of the volumes (virtual volumes). Specification speaking, regarding the management of the storage pool, the volume management program 104 defines one or more logical volumes in the storage areas provided by one or more hard disk devices as described earlier, manages one or more logical volumes as one storage pool, and associates a specified area in the storage pool with virtual volumes. The volume management program 104 is an example of a volume creation unit and an allocation unit according to the present invention.

Figure 5:
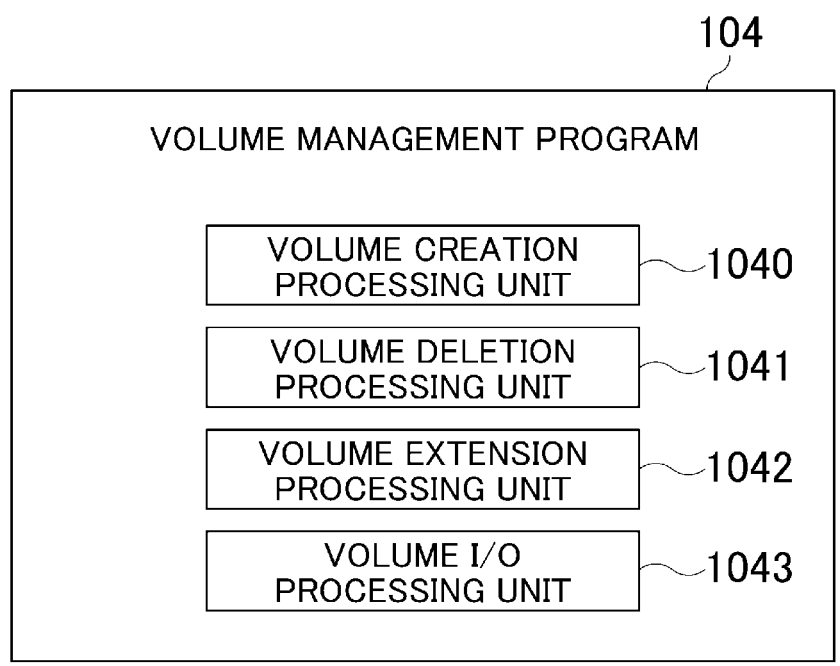
FIG. 5 is a block diagram showing the configuration of a volume management program according to the first embodiment.

Furthermore, the volume management program 104 includes a volume creation processing unit 1040, a volume deletion processing unit 1041, a volume extension processing unit 1042, and a volume I/O processing unit 1043 as shown in FIG. 5.

The volume creation processing unit 1040 creates a volume in accordance with a command from the storage management program 103. Specifically speaking, the volume creation processing unit 1040 associates the storage pool with the volume and registers the volume size and the ID of the host computer 200, which uses the volume, in the volume used capacity management table 1013. Association between the ID of the host computer 200 and the volume makes it possible to calculate a volume used amount not only for each volume, but also for each host computer 200 or each user.

Furthermore, the volume deletion processing unit 1041 deletes association between the storage pool and the volume and deletes the ID which is set to the volume. Also, as the volume is deleted, the volume deletion processing unit 1041 releases the volume used amount managed for each the host computer 200 or for each user.

The volume extension processing unit 1042 executes processing for extending the volume size. Specifically speaking, the volume extension processing unit 1042 extends the volume size by associating a larger storage pool volume with the volume.

The volume I/O processing unit 1043 executes input/output processing on the volumes. Specifically speaking, if the host computer 200 makes write access to a volume, the volume I/O processing unit 1043 allocates a storage area of a specified size from any logical volume in the storage pool associated with that volume, to the relevant segment of the write-accessed virtual volume.

The file system management program 106 manages association between file systems and virtual volumes and uses a file system management table 1064 to manage association between a file system and a user who uses that file system. For example, the file system management program 106 associates a file system ID for identifying the relevant file system with a number for indentifying the relevant volume in the file system management table 1064 and registers them in the file system management table 1064.

The file system management table 1064 includes a file system ID column 10640 and an LU column 10641 as shown in FIG. 7. The file system ID column 10640 stores a file system ID for identifying the relevant file system. The LU column 10641 stores a volume identification number corresponding to the file system.

Figure 6:
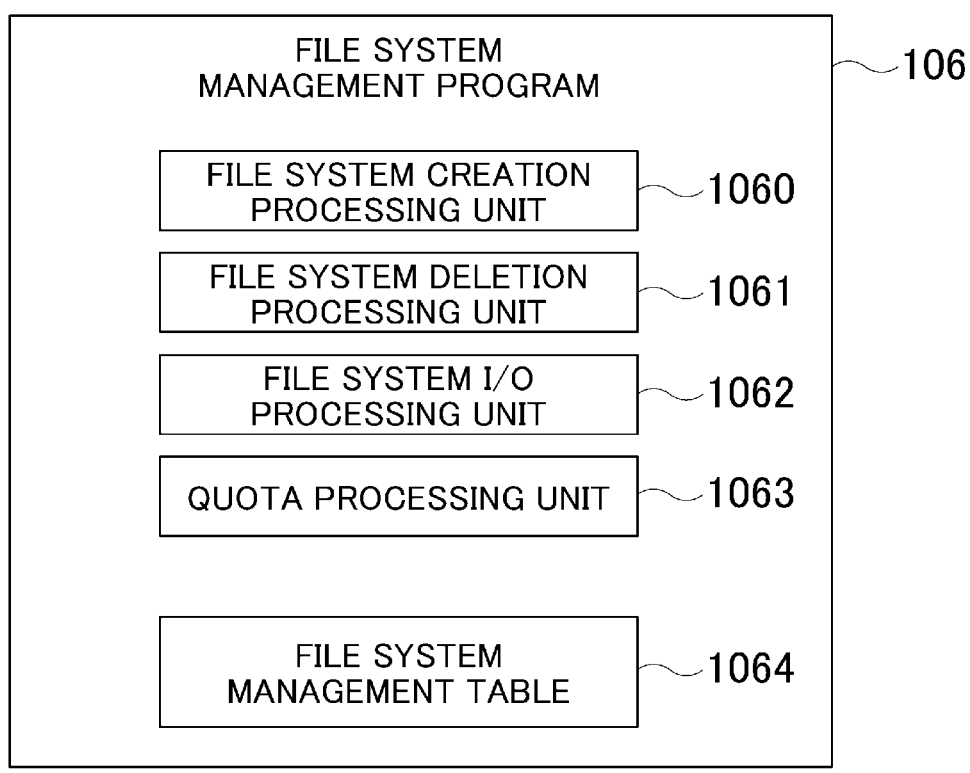
FIG. 6 is a block diagram showing the configuration of a file system management program according to the first embodiment.

Referring back to FIG. 6, the file system management program 106 includes, for example, a file system creation processing unit 1060, a file system deletion processing unit 1061, a file system I/O processing unit 1062, and a quota processing unit 1063.

The file system creation processing unit 1060 configures a file system in volumes in accordance with a command from the storage management program 103. Specifically speaking, the file system creation processing unit 1060 associates the storage pool with the file system and registers the size of the file system and the user ID of the user who uses the file system, in the volume used capacity management table 1013.

The file system deletion processing unit 1061 deletes association between the storage pool and the file system; and as the file system is deleted, the file system deletion processing unit 1061 releases a used amount of the file system managed for each host computer 200 or for each user.

The file system I/O processing unit 1062 executes input/output processing on the file system. Specifically speaking, when the host computer 200 makes write access to the file system, the file system I/O processing unit 1062 refers to the file system management table 1064 and specifies a volume corresponding to the file system ID. Then, the file system I/O processing unit 1062 writes data by providing the volume ID of the specified volume and write data to the volume I/O processing unit 1043.

The quota processing unit 1063 sets a quota for each directory of the file system. As a result, one physical file can be recognized virtually as a plurality of file systems. Also, the thin provisioning function is applied to the physical file system(s). As described above, a file system is created in a virtual volume provided by the thin provisioning. The quota processing unit 1063 sets a quota to the file system created in the virtual volume and limits the used capacity. Furthermore, when the host computer 200 makes write access to a file system, the quota processing unit 1063 judges whether the used capacity exceeds the quota threshold or not; and if the used capacity does not exceed the quota threshold, data can be written.

Figure 8:
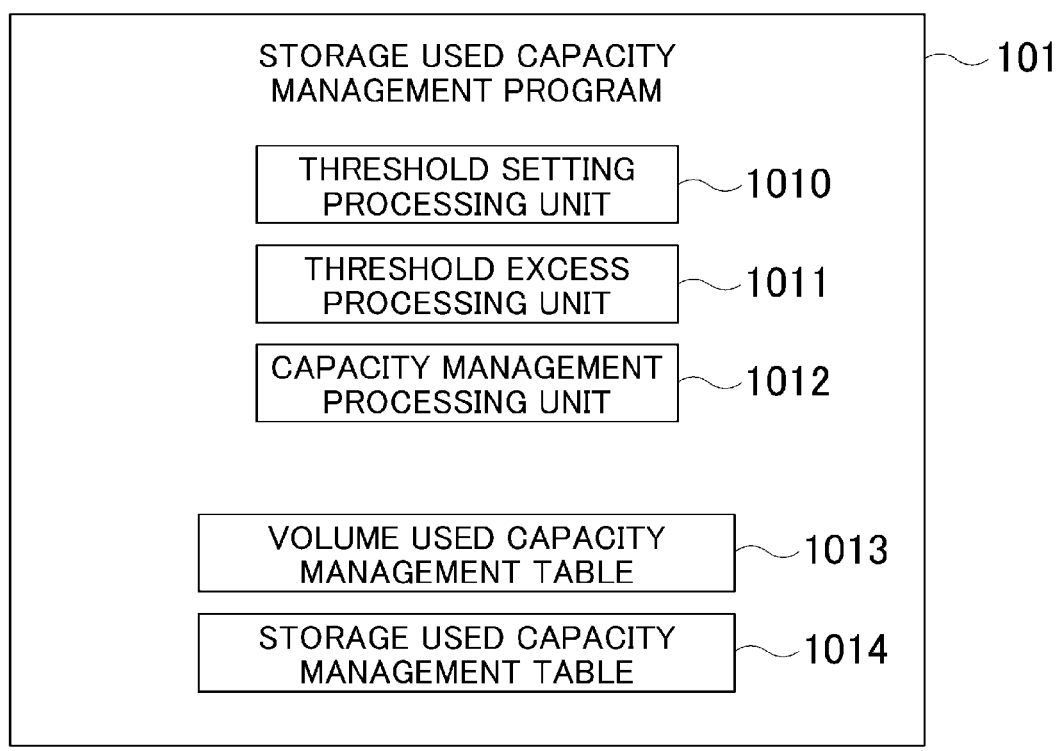
FIG. 8 is a block diagram showing the configuration of a storage used capacity management program according to the first embodiment.

The storage used capacity management program 101 integrally manages the capacity used within the storage apparatus 100. Specifically speaking, the storage used capacity management program 101 sets and changes a threshold for a data write capacity, calculates the capacity used for each volume, calculates the capacity used in the storage apparatus 100, judges whether the relevant capacity exceeds the set threshold or not, and executes processing when the relevant capacity exceeds the set threshold. For example, as shown in FIG. 8, the storage used capacity management program 101 includes a threshold setting processing unit 1010, a threshold excess processing unit 1011, a capacity management processing unit 1012, a volume used capacity management table 1013, and a storage used capacity management table 1014. The storage used capacity management program 101 is an example of a capacity management unit according to the present invention.

The threshold setting processing unit 1010 updates the storage used capacity management table 1014 in accordance with a command from the storage management program 103. Specifically speaking, the threshold setting processing unit 1010 sets, for each host computer 200, a threshold for the capacity which can be used by the host computer 200, and a notification method and where to report when the capacity exceeds the threshold.

Moreover, the threshold excess processing unit 1011 judges whether the volume used capacity of each host computer 200 exceeds a specified threshold or not. Specifically speaking, the threshold excess processing unit 1011 refers to the storage used capacity management table 1014, in which the threshold is set, and obtains the threshold for the volume used capacity which is set to the host computer requesting data writing. Then, the threshold excess processing unit 1011 judges whether or not the volume used capacity exceeds the threshold for the volume used capacity as a result of the data writing.

Furthermore, the capacity management processing unit 1012 tallies the used capacity of volumes, to which data have been written, and further tallies the total used capacity of volumes in the entire storage apparatus 100. Specifically speaking, the capacity management processing unit 1012 obtains the current used capacity of a target volume, to which data is to be written, from the volume used capacity management table 1013 and adds the capacity of data to be written to the above-obtained current used capacity, thereby updating the volume used capacity. Also, the capacity management processing unit 1012 obtains the volume used capacity of the host computer 200, which requests data writing, from the storage used capacity management table 1013 and adds the capacity of data to be written to the above-obtained used capacity, thereby updating the volume used capacity of the host computer 200.

The above-described volume used capacity management table 1013 is a table for managing the correspondence relationship between the used capacity of each volume and the host computer 200; and includes an LUN column 10130, an LU size column 10131, an ID column 10132, and a used capacity column 10133 as shown in FIG. 9.

The LUN column 10130 stores a volume name (LUN: Logical Unit Number) identified in the storage apparatus 100. The LU size column 10131 stores the size of each volume (LU: Logical Unit). The volume size herein means a maximum size that can be written to each volume and an upper limit of the size allocated from a volume pool.

The ID column 10132 stores information for identifying the host computer 200 which uses each volume (such as a server name, a user name, or a company name), or information for identifying a user who uses the host computer 200 (such as, a user ID). An example of the server ID can be an FQDN (Fully Qualified Domain Name). The used capacity column 10133 stores information about the capacity actually written to each volume. Therefore, immediately after a volume is created, the used capacity column 10133 stores 0 GB.

The above-mentioned information stored in the LUN column 10130, the LU size column 10131, and the ID column 10132 is set by the administrator of the storage apparatus 100 via the storage management interface 301 for the storage management server 300.

Figure 10:
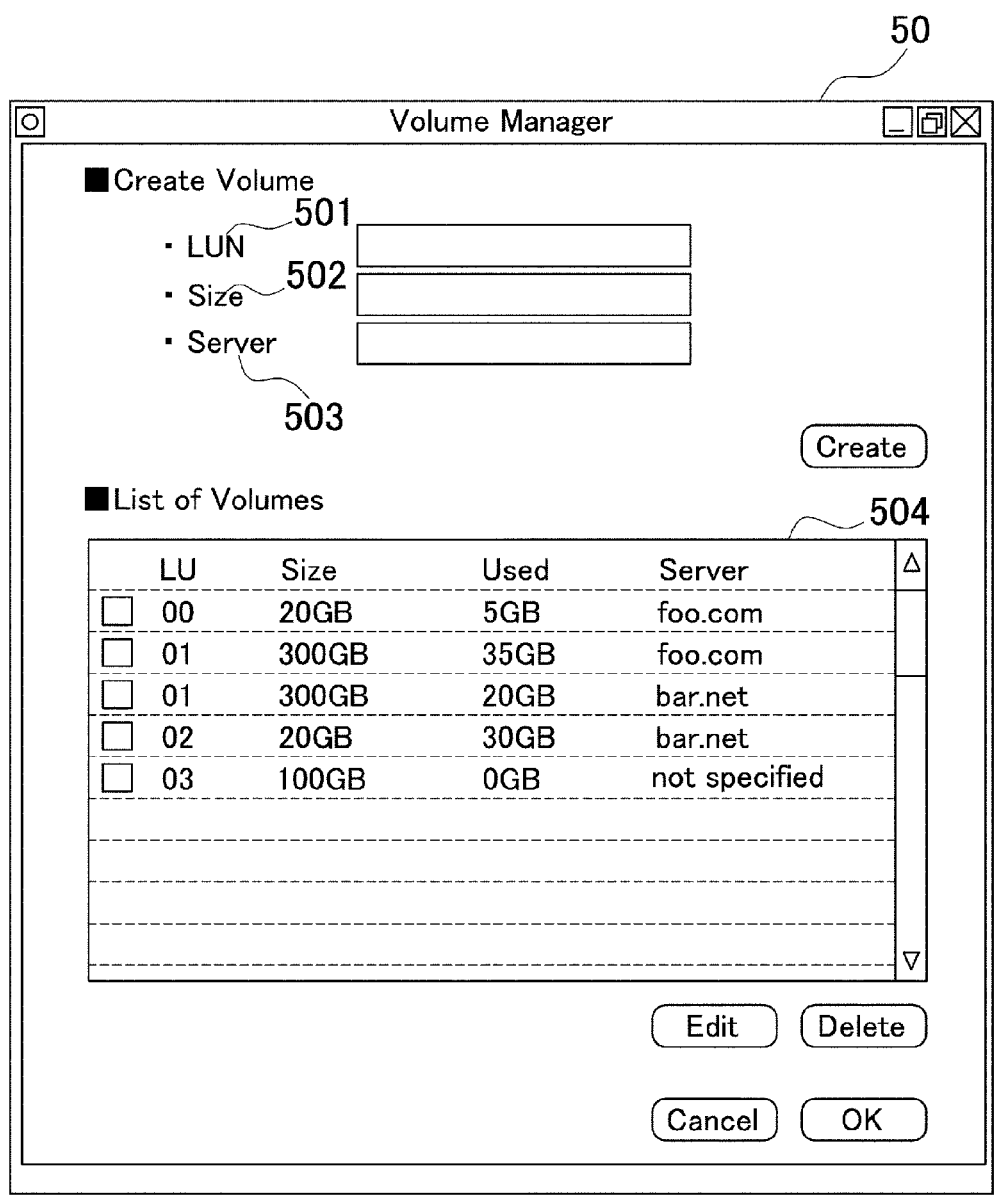
FIG. 10 is a display screen showing an example of a storage management interface according to the first embodiment.
Figure 12:
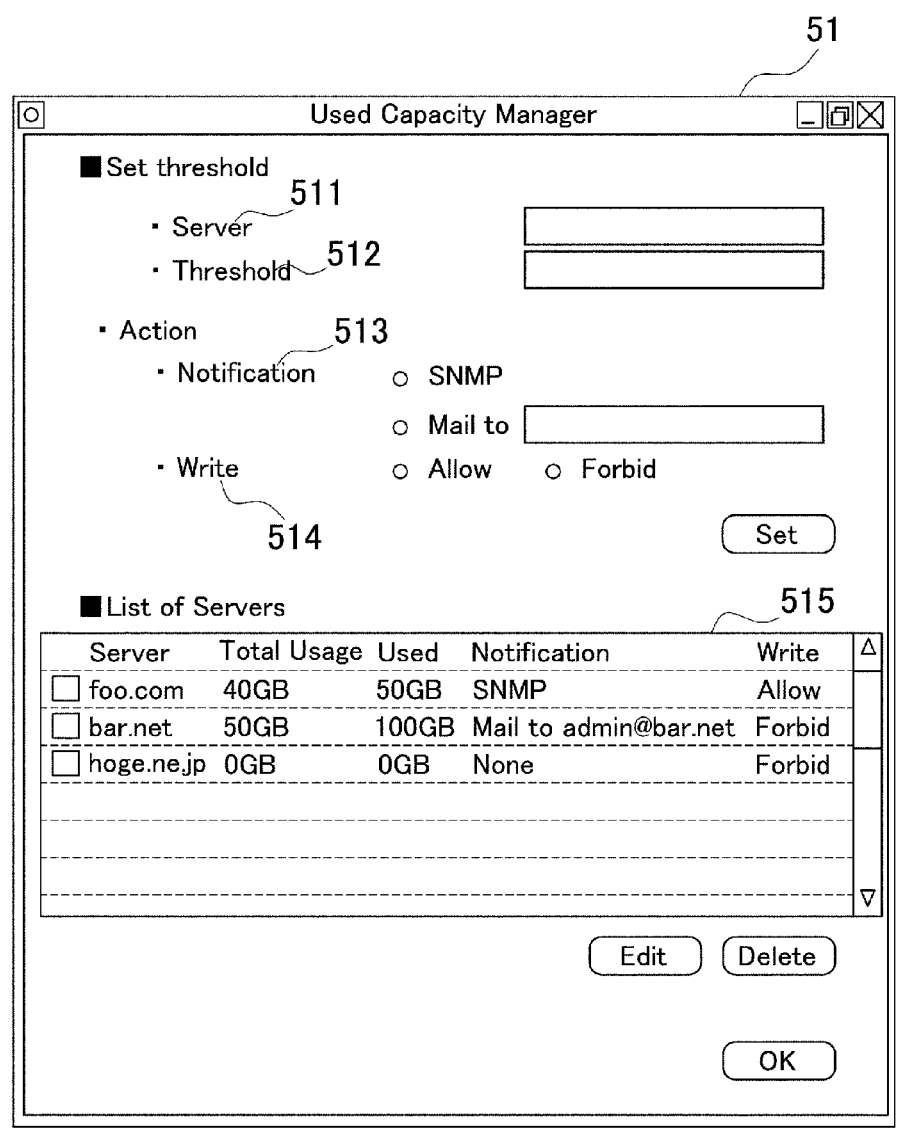
FIG. 12 is a display screen showing an example of the storage management interface according to the first embodiment.

An input screen example of the storage management interface 301 will be explained below. As shown in FIG. 10, an input screen example 50 for the storage management interface 301 includes a volume name (LUN) setting field 501, a volume size (Size) setting field 502, and a host name (Server) setting field 503. The administrator inputs a value to each setting field by using input devices, such as a mouse, a keyboard, and a touch panel, provided in the storage management server 300.

Moreover, the input screen example 50 shows that information stored in the volume used capacity management table 1013, including the volume name, size, used capacity, and host name of volumes in the storage apparatus 100, is displayed in a list of volumes 504.

The above-mentioned storage used capacity management table 1014 is a table for managing the total used capacity of each host computer 200 and the operation at the time of a threshold excess; and includes an ID column 10140, a total used capacity column 10141, a threshold column 10142, a notification column 10143, a where-to-report column 10144, and a write column 10145 as shown in FIG. 11.

The ID column 10140 stores information for identifying the host computer 200 (such as the server ID) or information for identifying a user who uses the host computer 200 (such as the user ID). The total used capacity column 10141 stores the actual volume used capacity for each host computer 200 or each user identified with the ID stored in the ID column 10140. In the threshold column 10142, a threshold is set for the volume used capacity which is set for each host computer 200 or user identified with the ID stored in the ID column 10140.

When the capacity stored in the total used capacity column 10141 exceeds the threshold stored in the threshold column 10142, the notification column 10143 stores information about a method for notifying the target host computer 200. When the notification method stored in the notification column 10143 is mail, the where-to-report column 10144 stores information about where to send the mail. When the capacity stored in the total used capacity column 10141 exceeds the threshold stored in the threshold column 10142, the write column 10145 stores information indicating whether or not the target host computer 200 or user should be permitted to write data.

Furthermore, the above-described information stored in the threshold column 10142, the notification column 101043, the where-to-report column 10144, and the write column 10145 is set by the administrator of the storage apparatus 100 via the storage management interface 301 for the storage management server 300.

Now, an input screen example of the storage management interface 301 will be explained. As shown in FIG. 11, an input screen example 51 of the storage management interface 301 includes a host name (Server) designating field 511, a threshold (Threshold) setting field 512, and a notification method (Notification) setting field 513, and a write (Write) setting field 514. The administrator inputs a value to each setting field by using input devices, such as a mouse, a keyboard, and a touch panel, provided in the storage management server 300.

Moreover, the input screen example 51 shows that information stored in the storage used capacity management table 1014, including the total used capacity, the threshold, the notification method, and where to report with respect to each host computer (Server) 200 or each user, is displayed in a list of servers 515.

(1-4) Detailed Operation of Storage Apparatus

Next, the detailed operation of the storage apparatus 100 will be explained. For example, creation of volumes, association between the host computers 200 and the volumes, and setting of a threshold are implemented by various programs stored in the memory 22 for the storage apparatus 100 as described above. Processing entities of various processing will be hereinafter explained as programs or respective components of the programs, but it is a matter of course that the storage apparatus 100 actually executes the processing based on such programs or similar.

Figure 13:
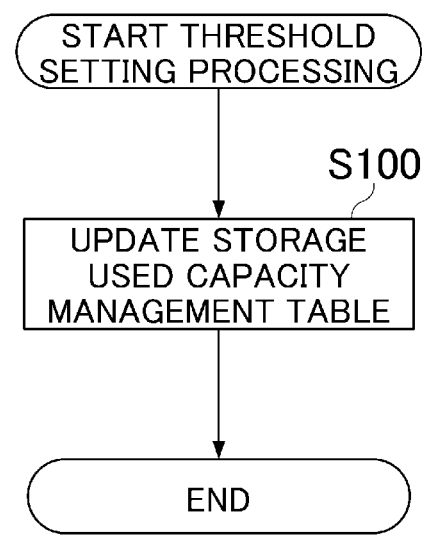
FIG. 13 is a flowchart illustrating a processing sequence for threshold setting processing according to the first embodiment.

As shown in FIG. 13, the storage used capacity management program 101 firstly sets a threshold for the volume used capacity for each host computer 200 or user according to input by the administrator (S100). Specifically speaking, the threshold setting processing unit 1010 for the storage used capacity management program 101 updates the storage used capacity management table 1014 and sets the ID of the target host computer 200, the threshold for the volume used capacity, the notification method and where to report in a case of a threshold excess, and whether data writing should be permitted or not in the case of the threshold excess.

Figure 14:
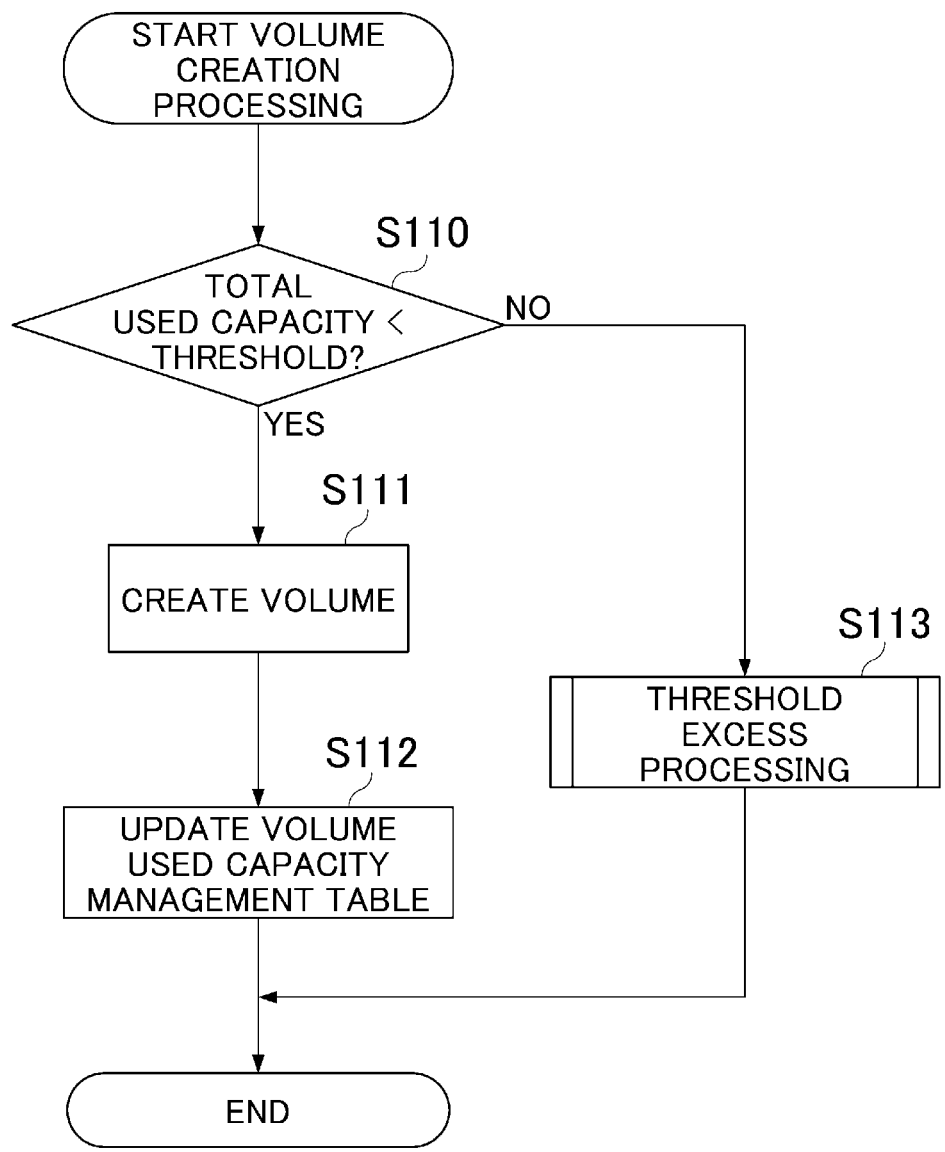
FIG. 14 is a flowchart illustrating a processing sequence for volume creation processing according to the first embodiment.

Next, volume creation processing will be explained. As shown in FIG. 14, the volume management program 104 creates a virtual volume in the storage apparatus 100 according to input by the administrator. Specifically speaking, the volume creation processing unit 1040 for the volume management program 104 firstly refers to the storage used capacity management table 1014, obtains the total used capacity and threshold for volumes of the host computer 200, for which a data write request is issued, and judges whether or not the total used capacity exceeds the threshold (S110).

If it is determined in step S110 that the total used capacity does not exceed the threshold, the volume creation processing unit 1040 creates a volume (S111). Specifically speaking, the volume creation processing unit 1040 creates a new volume by associating the volume with the storage pool and setting a maximum capacity of the volume. The volume creation processing unit 1040 then updates the volume used capacity management table 1013 (S112).

If it is determined in step S110 that the total used capacity exceeds the threshold, the threshold excess processing unit 1011 executes threshold excess processing (S113). The threshold excess processing in step S113 will be explained later in detail.

Figure 15:
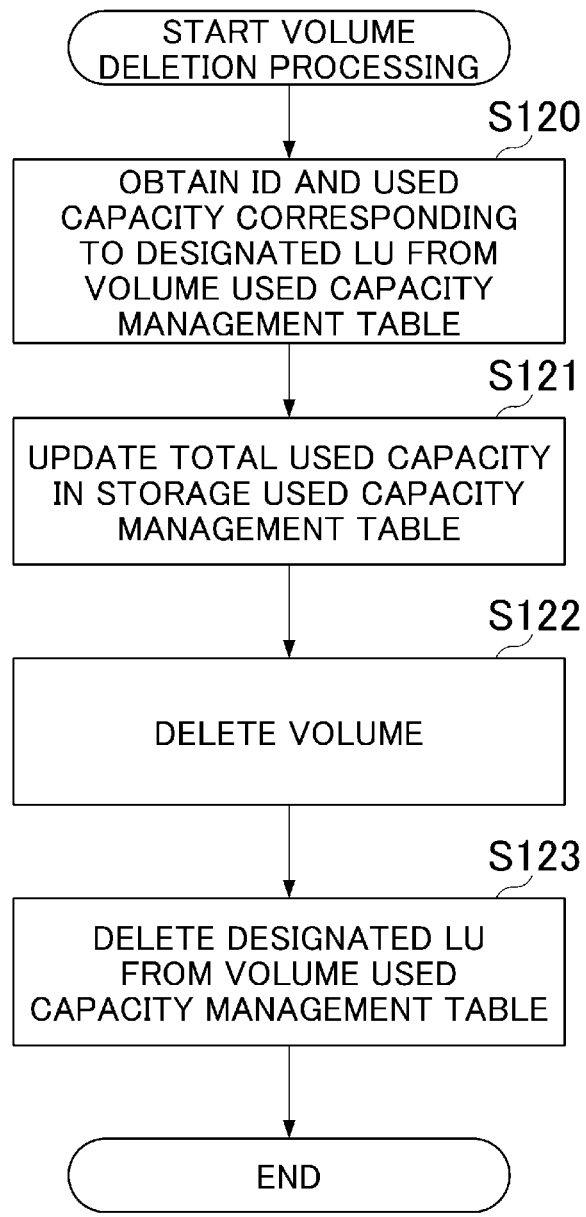
FIG. 15 is a flowchart illustrating a processing sequence for volume deletion processing according to the first embodiment.

Next, volume deletion processing will be explained. As shown in FIG. 15, the volume management program 104 deletes a virtual volume (volume) of the storage apparatus 100 according to input by the administrator. Specifically speaking, the volume deletion processing unit 1041 for the volume management program 104 refers to the volume used capacity management table 1013 and obtains the ID of the host computer 200 and the used capacity corresponding to the volume (LU) designated by the administrator (S120).

The volume deletion processing unit 1041 then subtracts the used capacity obtained in step S120 from the total used capacity corresponding to the ID of the host computer 200 in the storage used capacity management table 1014, thereby updates the total used capacity (S121).

Subsequently, the volume deletion processing unit 1041 deletes the volume by, for example, deleting association between the relevant volume and the storage pool and deleting the ID of the host computer 200 which is set to the volume (S122). Then, the volume deletion processing unit 1041 deletes a record of the volume (LU) designated by the administrator from the volume used capacity management table 1013 (S123).

Figure 16:
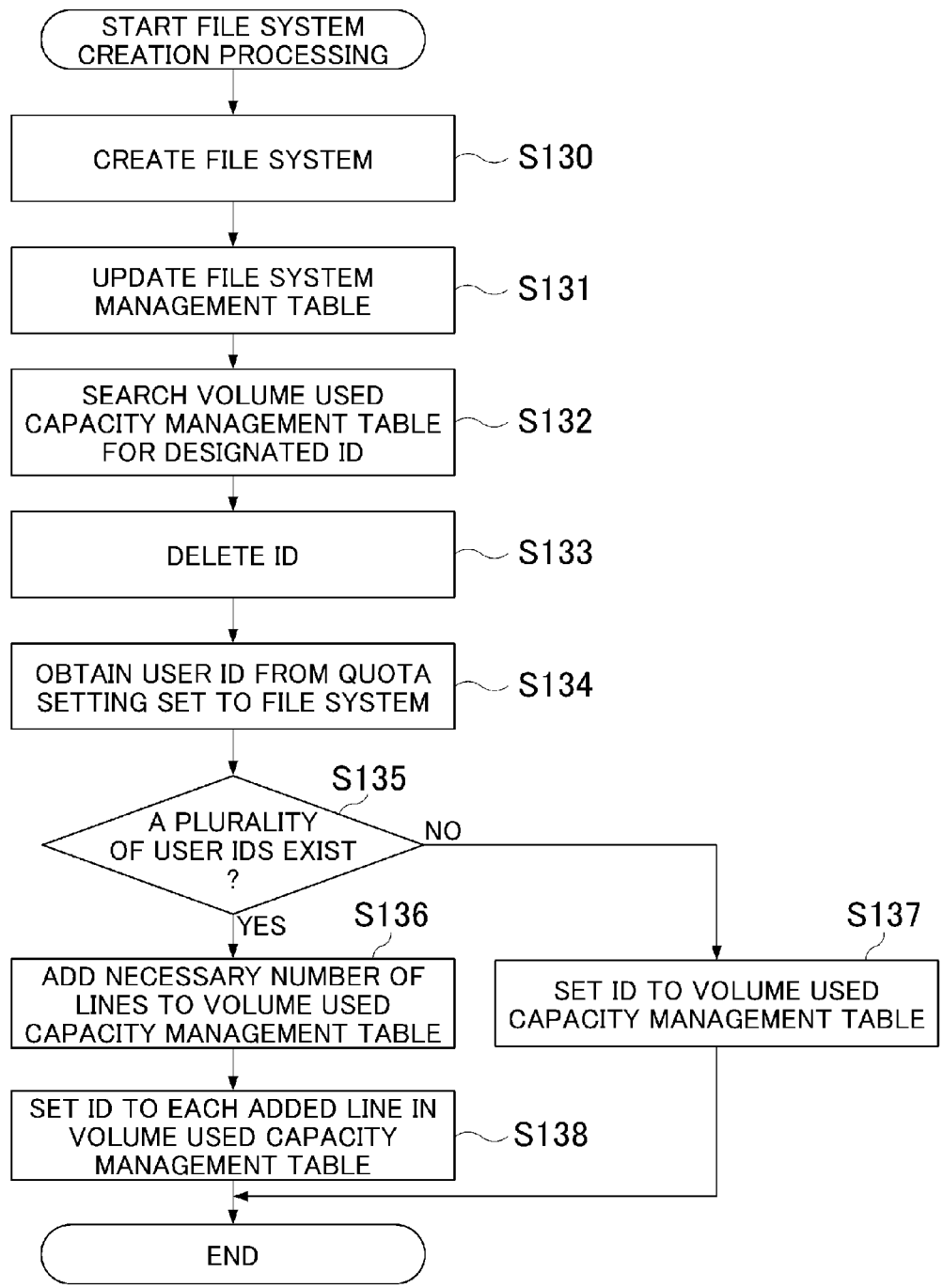
FIG. 16 is a flowchart illustrating a processing sequence for file system creation processing according to the first embodiment.

Next, file system creation processing will be explained. As shown in FIG. 16, the file system creation processing unit 1060 creates a file system in the storage apparatus 100 according to input by the administrator. Specifically speaking, the file system creation processing unit 1060 for the file system management program 106 firstly creates a file system in the volume designated by the administrator (S130). The file system creation processing unit 1060 then updates the file system management table 1064 (S131). Specifically speaking, the file system management table 1064 stores association between the volume number and the file system ID.

Subsequently, the file system creation processing unit 1060 refers to the volume used capacity management table 1013 and searches for the volume designated in step S130 (S132). The file system creation processing unit 1060 then deletes the ID set to the volume found as a result of the search in step S132 (S133). Since the ID for identifying the host computer 200 is set to each volume at the time of volume creation as described above, the ID set to the volume is deleted when creating a file system in the volume.

Next, the file system creation processing unit 1060 refers to the quota setting information, which is set to each file system, and obtains the user ID associated with each file system (S134). The file system creation processing unit 1060 then judges whether more than one user ID, which is obtained in step S134, exists or not (S135).

If it is determined in step S135 that more than one such user ID exists, the file system creation processing unit 1060 adds a necessary number of lines to the volume used capacity management table 1013 (S136). The file system creation processing unit 1060 then associates each volume number with the relevant user ID and records them in the lines added in step S136 to the volume used capacity management table 1013.

On the other hand, if it is determined in step S135 that there is one user ID, the file system creation processing unit 1060 associates the volume number with the user ID and records them in the volume used capacity management table 1013. As a result, it is possible to manage which volume is used by which user, according to this embodiment by associating the volume with the user ID of the file system created in the volume and registering them in the volume used capacity management table 1013 in addition to the normal file system creation processing.

Figure 17:
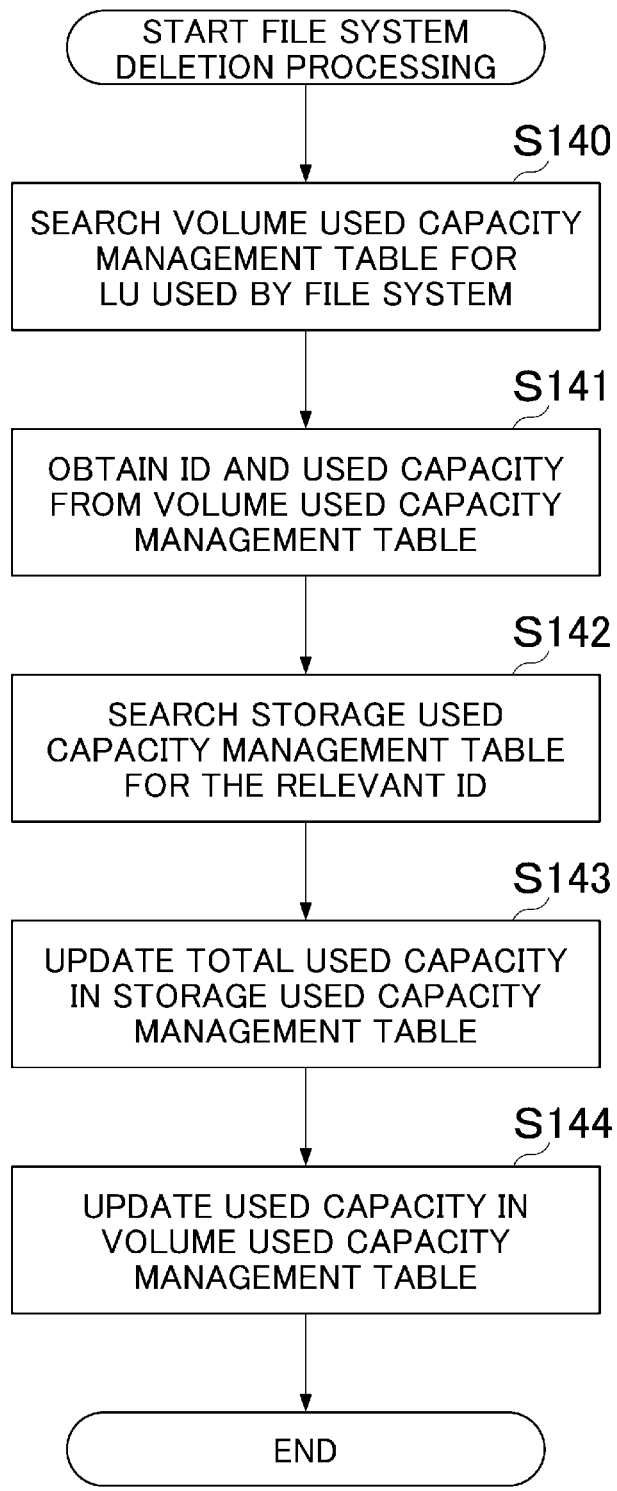
FIG. 17 is a flowchart illustrating a processing sequence for file system deletion processing according to the first embodiment.

Next, file system deletion processing will be explained. The file system management program 106 deletes a file system created in a virtual volume according to input by the administrator. Specifically speaking, as shown in FIG. 17, the file system deletion processing unit 1061 for the file system management program 106 searches the volume used capacity management table 1013 for a volume (LU) used by the designated file system (S140).

Subsequently, the file system deletion processing unit 1061 obtains the ID of the host computer 200 and the used capacity corresponding to the volume found as a result of the search in step S140 from the volume used capacity management table 1013 (S141). The file system deletion processing unit 1061 then searches the storage used capacity management table 1014 for the ID of the host computer 200 obtained in step S141 (S142).

Then, the file system deletion processing unit 1061 updates the total used capacity in the storage used capacity management table 1014 (S143). Specifically speaking, the file system deletion processing unit 1061 subtracts the used capacity obtained in step S141 from the total used capacity stored in the storage used capacity management table 1014 corresponding to the ID found as a result of the search in step S142. Subsequently, the file system deletion processing unit 1061 updates the used capacity in the volume used capacity management table 1013 (S144). Specifically speaking, the file system deletion processing unit 1061 releases the used capacity corresponding to the relevant ID from the used capacity in the volume used capacity management table 1013. Releasing the used capacity herein means setting the used capacity to 0.

Figure 18:
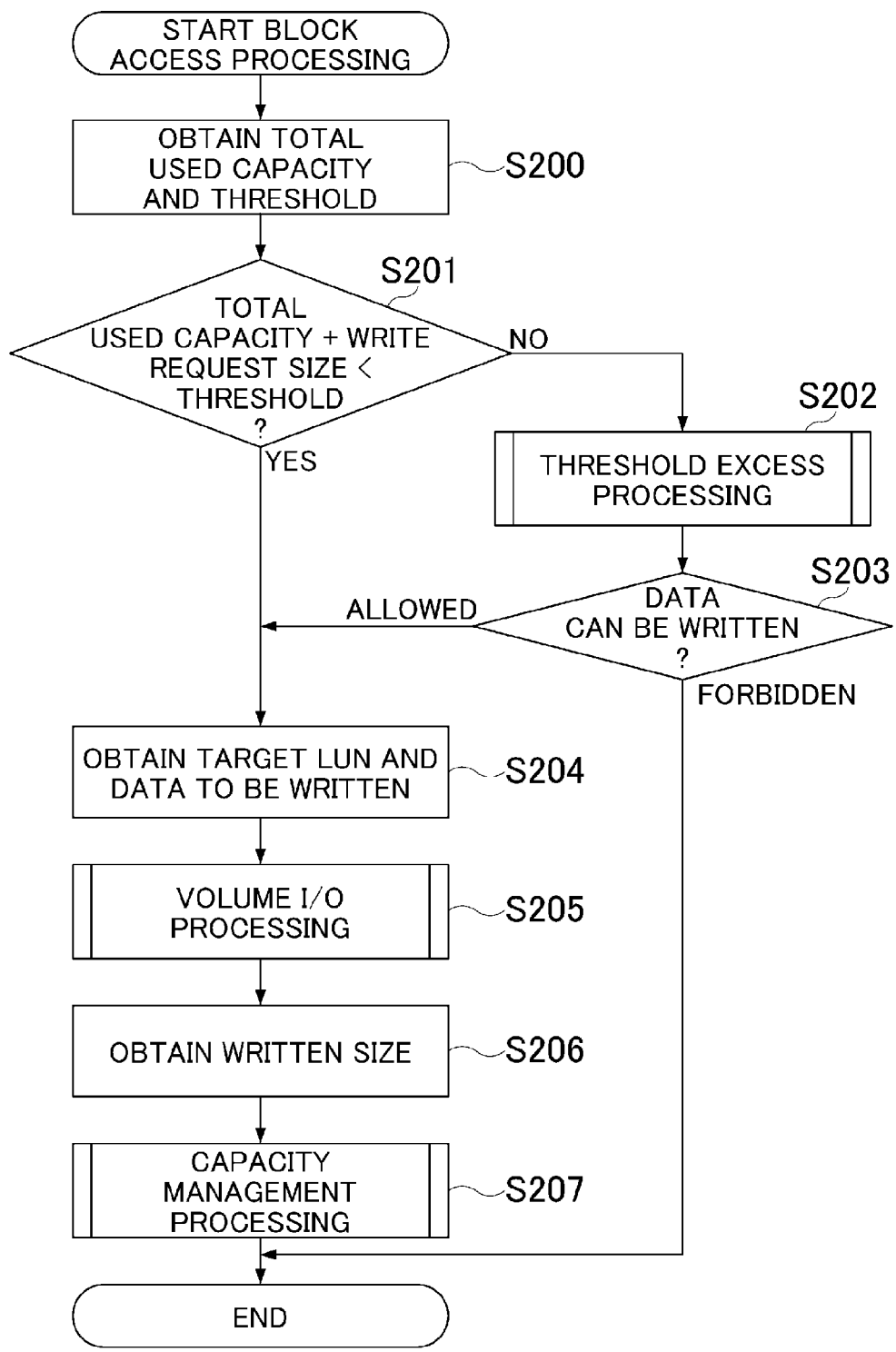
FIG. 18 is a flowchart illustrating a processing sequence for block access processing according to the first embodiment.

Next, block access processing will be explained. As described earlier, the block access processing is processing executed by the block access processing program 105 for writing data to each volume in response to a block-based data write request from the host computer 200. Specifically speaking, the block access processing program 105 firstly obtains the total used capacity and the threshold corresponding to the ID of the host computer 200, for which the data write request is issued, from the storage used capacity management table 1014 as shown in FIG. 18 (S200).

The block access processing program 105 then calculates the sum of the total used capacity obtained in step S200 and the size of write data requested by the host computer 200 and judges whether the total value exceeds a threshold or not (S201).

If it is determined in step S201 that the total value is less than the threshold, the block access processing program 105 obtains the volume number (LUN) of the target volume and data to be written to that volume and invokes volume I/O processing (S204). Then, the volume I/O processing unit 1043 executes the volume I/O processing (S205). The volume I/O processing will be explained later in detail.

The block access processing program 105 obtains the size of data written to the volume by the volume I/O processing unit 1043 in step S204 and invokes capacity management processing (S206). The capacity management processing unit 1012 for the storage used capacity management program 101 then executes the capacity management processing (S207). The capacity management processing executed in step S207 will be explained later in detail.

Incidentally, the entity tallying the size of written data may be either the block access processing program 105 or the volume management program 104. If the block access processing program 105 is to tally the size of written data, the block access processing program 105 issues a SCSI command to write data to a virtual volume and then tallies the number of written blocks or the size of written data for the SCSI command for which a write completion response has been returned. The size of written data can be obtained by multiplying the number of blocks by a block size specified by the system. If the volume management program 105 is to tally the size of written data, the volume management program 105 tallies the number of written blocks or the size of written data for the SCSI command, for which the write processing has been executed, after receiving the SCSI command from the block access processing program 105. Also, the volume management program 105 may tally the capacity allocated from the storage pool. The number of allocated pages or the page size is tallied when tallying the capacity allocated from the storage pool.

Figure 19:
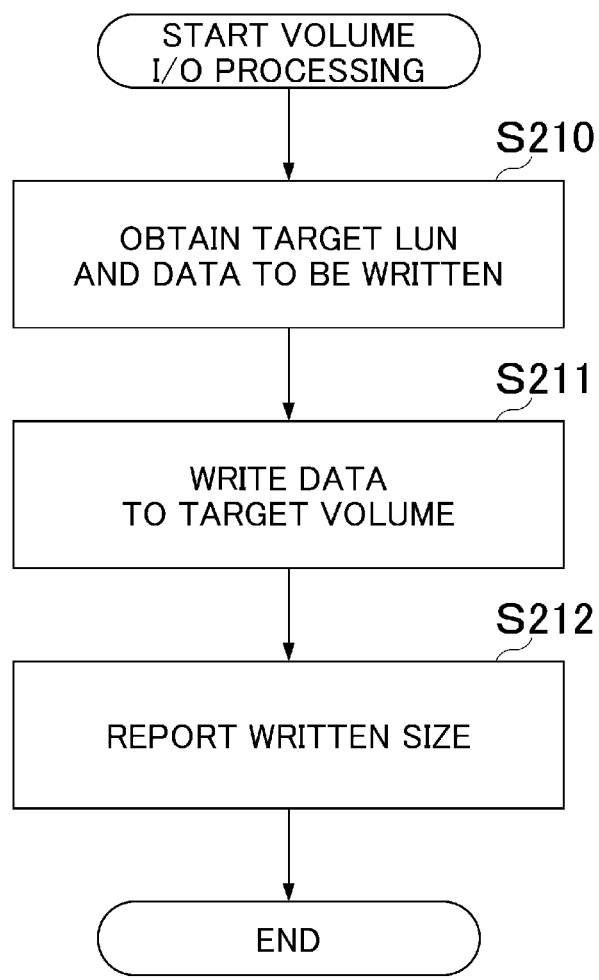
FIG. 19 is a flowchart illustrating a processing sequence for volume I/O processing according to the first embodiment.

Next, the details of the volume I/O processing executed in step S205 described above will be explained. As shown in FIG. 19, the volume I/O processing unit 1043 firstly obtains the volume number (LUN), which is a data write target, and the write data from another processing unit which received a data write command (S210). The volume I/O processing unit 1043 then writes the data to the write target volume obtained in step S210 (S211). Subsequently, the volume I/O processing unit 1043 notifies the other processing unit, which received the data write command, of the size of data written in step S211 (S212).

Figure 20:
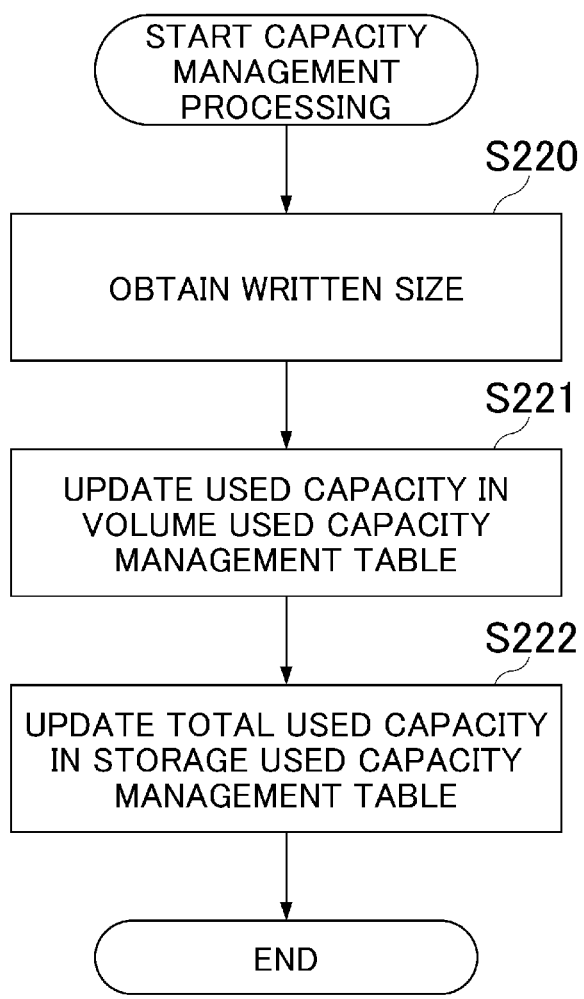
FIG. 20 is a flowchart illustrating a processing sequence for capacity management processing according to the first embodiment.

Next, the details of the capacity management processing executed in step S207 described above will be explained. As shown in FIG. 20, the capacity management processing unit 1012 obtains the size written to the volume from another processing unit such as the block access processing program 105 (S220). The capacity management processing unit 1012 then updates the used capacity in the volume used capacity management table 1013. Specifically speaking, the capacity management processing unit 1012 adds the data size obtained in step S220 to the data size in the used capacity column 10133 for the target volume in the volume used capacity management table 1013. The capacity management processing unit 1012 further updates the total used capacity in the storage used capacity management table 1014. Specifically speaking, the capacity management processing unit 1012 adds the data size obtained in step S220 to the data size in the total used capacity column 10141 for the target host computer 200 in the storage used capacity management table 1014.

Figure 21:
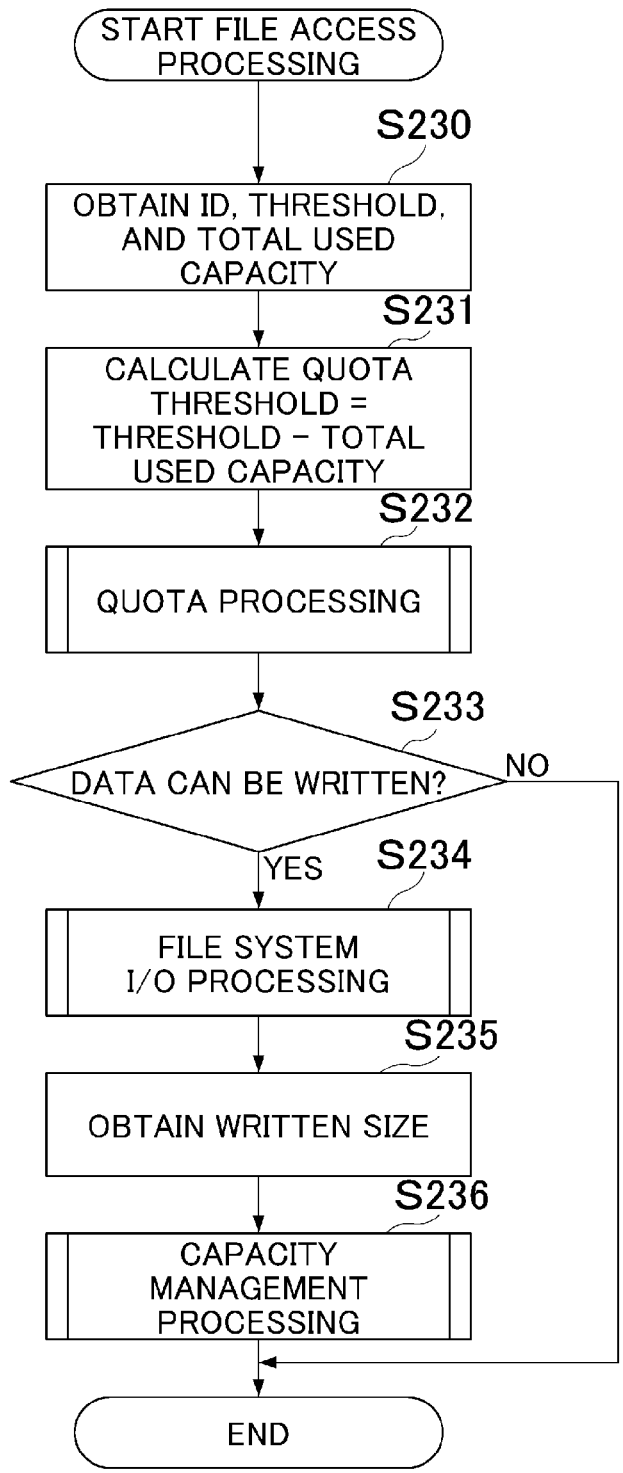
FIG. 21 is a flowchart illustrating a processing sequence for file access processing according to the first embodiment.

Next, file access processing will be explained. As described earlier, the file access processing is processing executed by the file access processing program 102 for writing data to each file system in response to a file-based data write request from the host computer 200. Specifically speaking, as shown in FIG. 21, when receiving a data write request from the host computer, the file access processing program 102 firstly obtains the user ID, which is set to the file system, that is, a data write target, as well as the threshold and total used capacity corresponding to that ID from the storage used capacity management table 1014 (S230).

The file access processing program 102 then subtracts the total used capacity from the threshold obtained in step S230 and sets the value obtained by subtraction to a quota threshold which is set to the file system (S231). Subsequently, the file access processing program 102 provides the quota threshold, which was set in step 231, to the quota processing unit 1063, and the quota processing unit 1063 executes quota processing (S232). The quota processing executed in step S232 will be explained later in detail.

Next, as a result of the quota processing executed in step S232, the file access processing program 102 judges whether data can be written or not (S233). If it is determined in step S233 that the data can be written, the file access processing program 102 provides the write target file system and the write data to the file system I/O processing unit 1062, and the file system I/O processing unit 1062 executes file system I/O processing. On the other hand, if it is determined in step S233 that the data cannot be written, the processing terminates.

After the file system I/O processing unit 1062 executes the file system I/O processing in step S234, the file access processing program 102 obtains the data size of the data written to the file system from the file system I/O processing unit 1062 (S235). The file access processing unit 102 then provides the data size obtained in step S235 to the capacity management processing unit 1012, and the capacity management processing unit 1012 executes capacity management processing (S236). Since the capacity management processing executed in step S236 is the same as the capacity management processing (FIG. 20), any detailed explanation thereof has been omitted.

Figure 22:
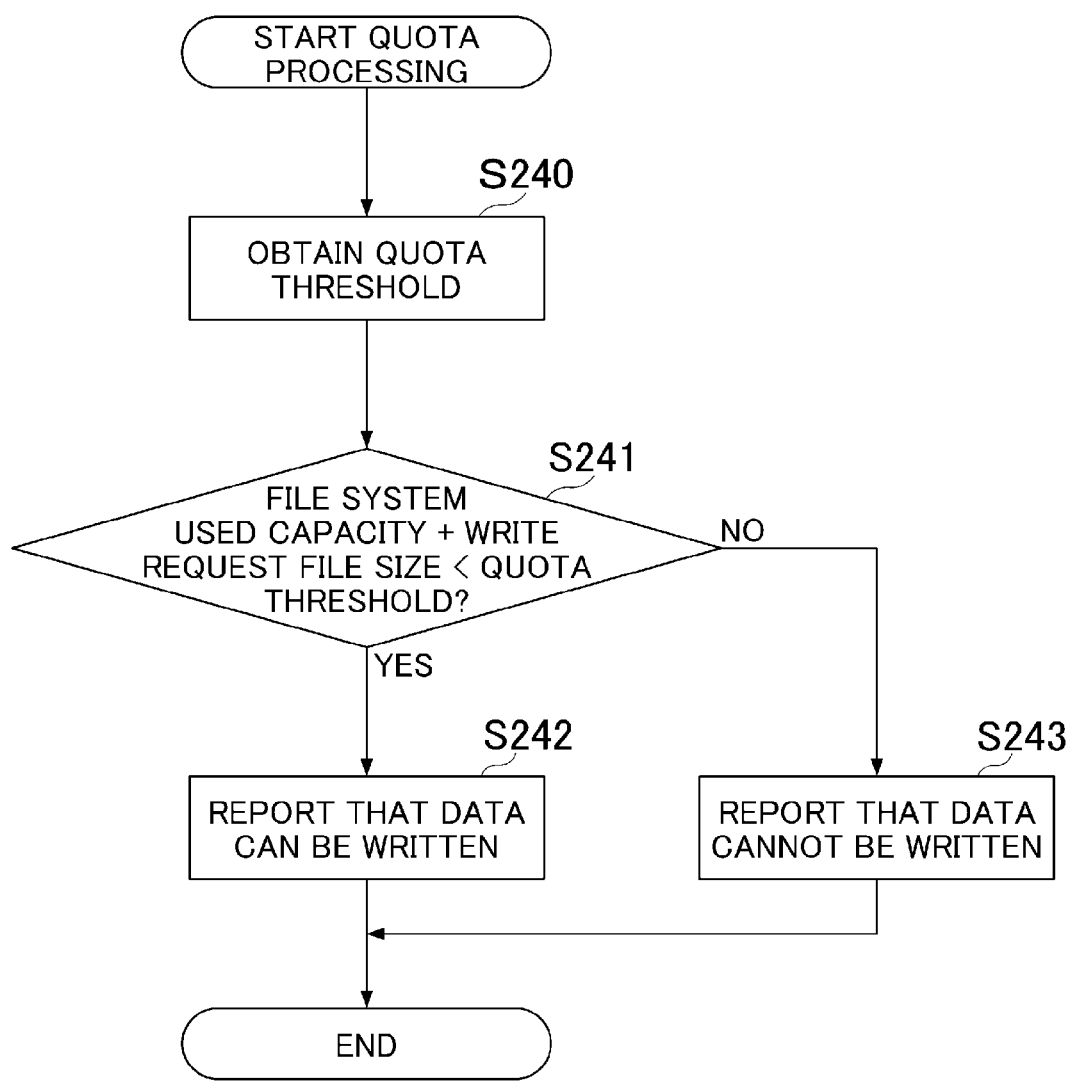
FIG. 22 is a flowchart illustrating a processing sequence for quota processing according to the first embodiment.

Next, the details of the quota processing executed in step S232 described above will be explained. The quota processing unit 1063 executes the quota processing by using the quota threshold which is set for the file system. Specifically speaking, the quota processing unit 1063 obtains the quota threshold for the file system, which is set in advance, as shown in FIG. 22 (S240). The quota processing unit 1063 adds the file size, for which the write request is issued from the host computer 200, to the used capacity of the file system and judges whether the value obtained by the addition is less than the quota threshold or not (S241).

If it is determined in step S241 that the value obtained by the addition is less than the quota threshold, the quota processing unit 1063 notifies the file access processing unit 1012 that data can be written (S242). On the other hand, if it is determined in step S241 that the value obtained by the addition is equal to or more than the quota threshold, the quota processing unit 1063 notifies the file access processing unit 1012 that data cannot be written (S243).

Figure 23:
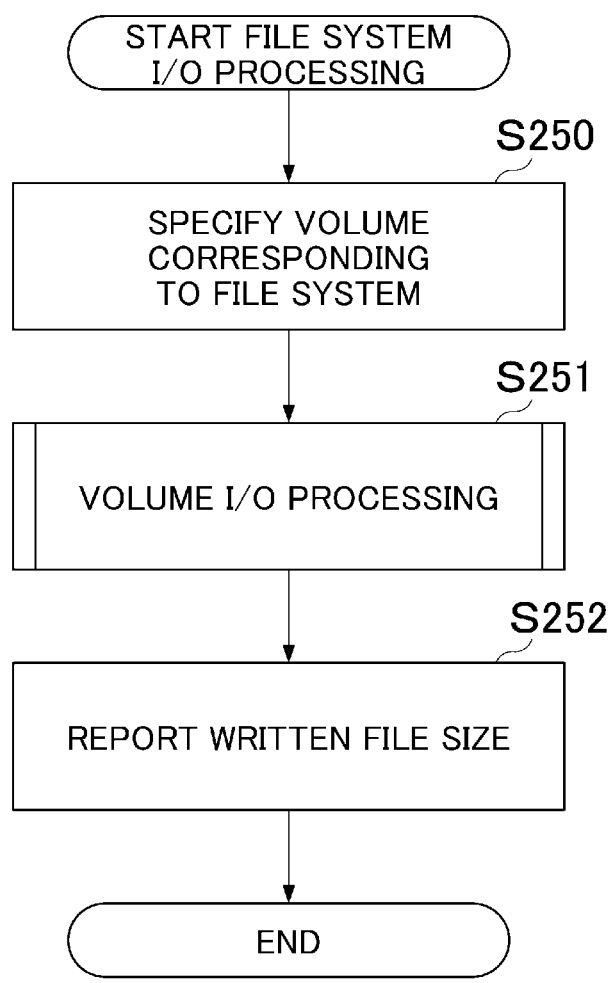
FIG. 23 is a flowchart illustrating a processing sequence for file system I/O processing according to the first embodiment.

Next, the details of the file system I/O processing executed in step S234 described above will be explained. As shown in FIG. 23, the file system I/O processing unit 1062 refers to the file system management table 1064 and specifies a volume corresponding to the file system which is the data write target (S250). The file system I/O processing unit 1062 then provides the volume number (LUN) of the volume specified in step S250 and the write data to the volume I/O processing unit 1043, and the volume I/O processing unit 1043 executes volume I/O processing (S251). Subsequently, the file system I/O processing unit 1062 provides the file size written to the file system to the file access processing unit 1012 (S252).

Figure 24:
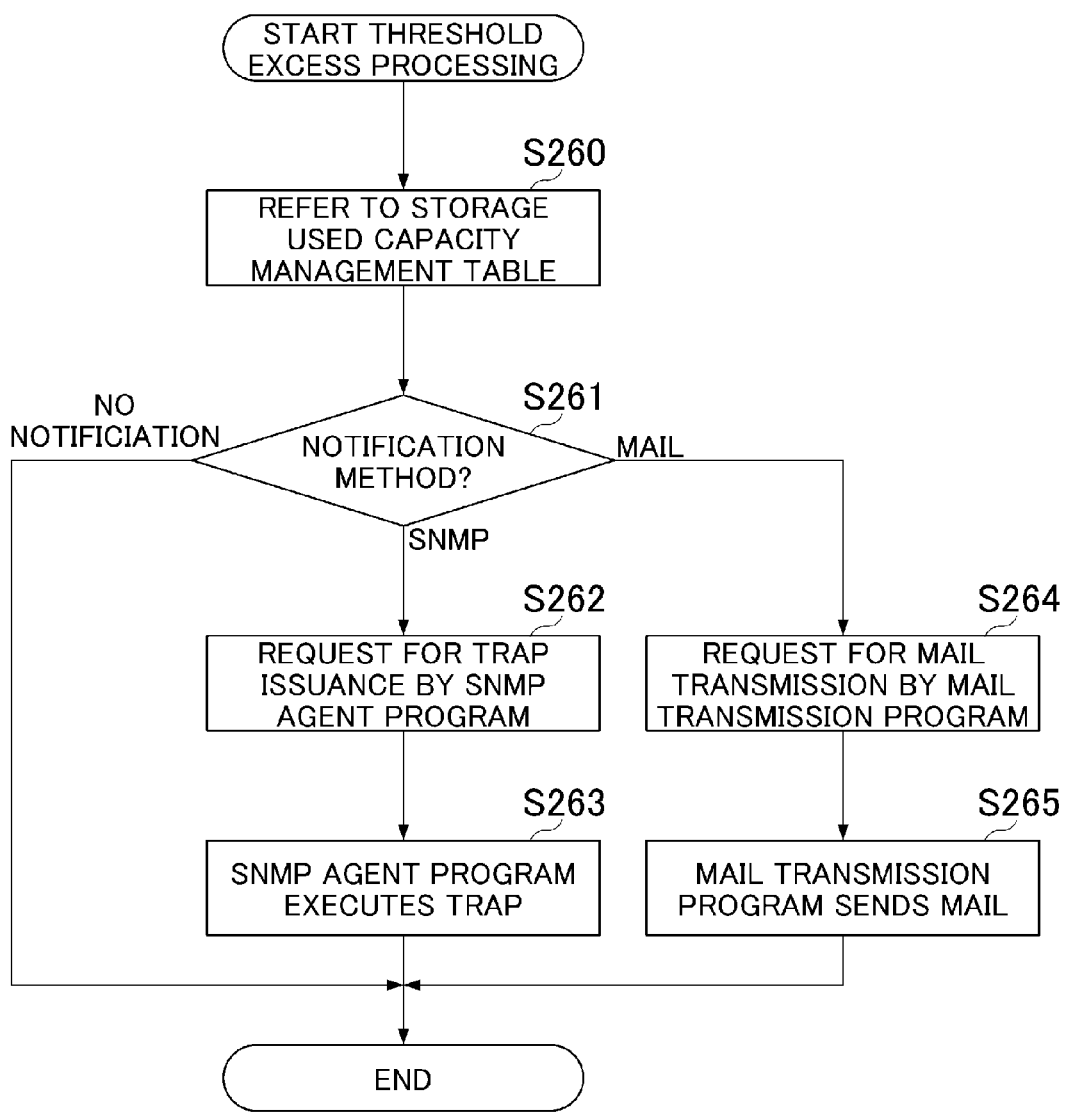
FIG. 24 is a flowchart illustrating a processing sequence for threshold excess processing according to the first embodiment.

Next, the threshold excess processing executed by the threshold excess processing unit 1011 in step S113 described above will be explained. As shown in FIG. 24, the threshold excess processing unit 1011 firstly refers to the storage used capacity management table 1014 (S260). The threshold excess processing unit 1011 then judges which method is used as the notification method corresponding to the ID of the target host computer 200 in the storage used capacity management table 1014 (S261).

If it is determined in step S261 that the notification method is SNMP, the threshold excess processing unit 1011 requests for trap issuance by the SNMP agent program 107 (S262). The trap issued by the SNMP means a status notification report sent from a management target terminal of the SNMP to the server. The SNMP agent program 107 then executes the trap requested by the threshold excess processing unit 1011 in step S262 (S263).

On the other hand, if it is determined in step S261 that the notification method is mail, the threshold excess processing unit 1011 requests for mail transmission from the mail transmission program 108 (S264). The mail transmission program 108 then sends the mail requested by the threshold excess processing unit 1011 in step S264 (S265). If it is determined in step S261 that no notification should be made upon the threshold excess processing, the threshold excess processing unit 1011 terminates the processing.

Next, processing for changing the threshold set to the storage used capacity management table 1014 will be explained. The administrator operates the storage management interface 301 for the storage management server 300 to give a command to the storage management program 103 to execute the processing for changing the threshold. The storage management program 103 executes the threshold change processing by using the threshold setting processing unit 1011 for the storage used capacity management program 101.

Figure 25:
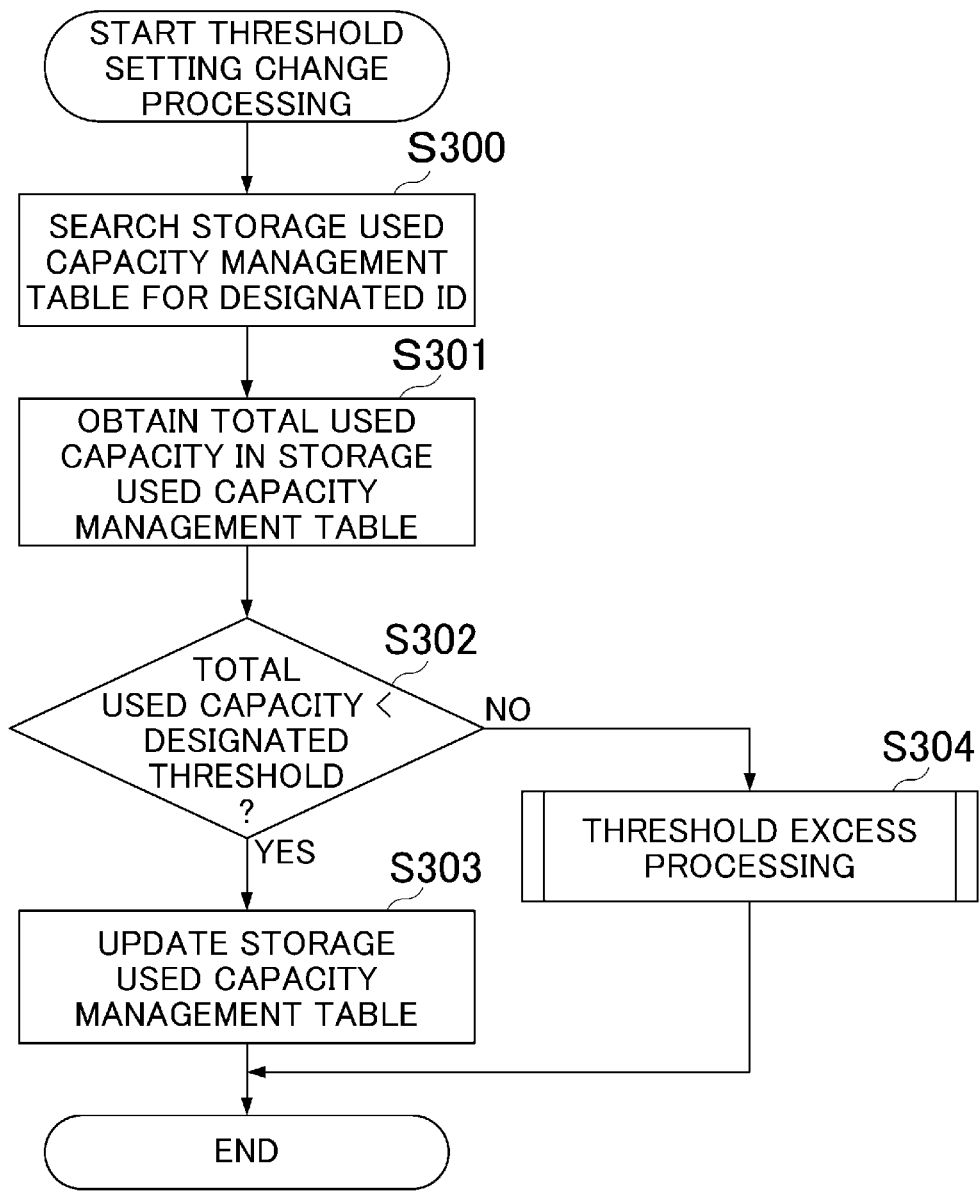
FIG. 25 is a flowchart illustrating a processing sequence for threshold setting change processing according to the first embodiment.

As shown in FIG. 25, the threshold setting processing unit 1011 firstly searches the storage used capacity management table 1014 for the ID of the host computer 200 designated by the administrator (S300). The threshold setting processing unit 1011 then obtains the total used capacity corresponding to the ID found as the result of the search in step 300 from the storage used capacity management table 1014 (S301).

Subsequently, the threshold setting processing unit 1011 judges whether the total used capacity obtained in step S301 is less than the threshold designated by the administrator (S302). If it is determined in step S302 that the total used amount is less than the threshold designated by the administrator, the threshold setting processing unit 1011 updates the threshold in the storage used capacity management table 1014 to the threshold designated by the administrator (S303). On the other hand, if it is determined in step S302 that the total used amount is equal to or more than the threshold designated by the administrator, the threshold excess processing unit 1011 executes the threshold excess processing (S304). Since the threshold excess processing in step S304 is the same as the threshold excess processing executed by the threshold excess processing unit 1011 as shown in FIG. 24, any detailed explanation thereof has been omitted.

Next, volume extension processing in a case of volume extension according to input by the administrator will be explained. The administrator operates the storage management interface 301 for the storage management server 300 and gives a command to the storage management program 103 to execute the volume extension processing. The storage management program 103 executes the volume extension processing by using the volume extension processing unit 1042 for the volume management program 104.

Figure 26:
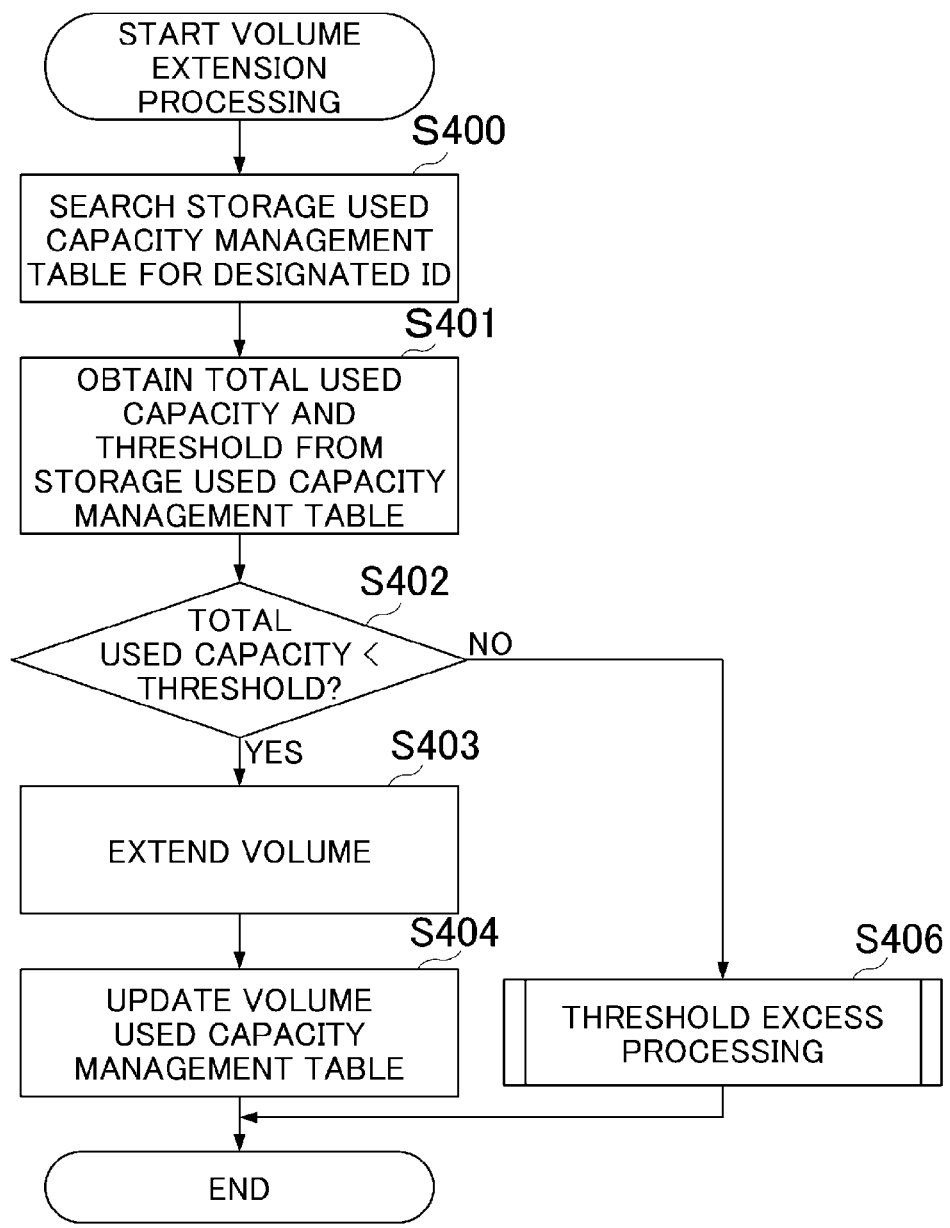
FIG. 26 is a flowchart illustrating a processing sequence for volume extension processing.

As shown in FIG. 26, the volume extension processing unit 1042 firstly searches the storage used capacity management table 1014 for the ID of the host computer 200 designated by the administrator (S400). The volume extension processing unit 1042 then obtains the total used amount and threshold corresponding to the ID found as the result of the search in step S400 from the storage used capacity management table 1014 (S401).

Subsequently, the volume extension processing unit 1042 compares the total used amount with the threshold, which are obtained in step S401, and judges whether the total used amount is less than the threshold or not (S402). If it is determined in step S402 that the total used amount is less than the threshold, the volume extension processing unit 1042 extends the volume (S403).

The volume extension processing unit 1042 then updates the volume used capacity management table 1013 (S404). Specifically speaking, the volume extension processing unit 1042 updates the LU size 10131 in the volume used capacity management table 1013 to the volume size extended in step S403.

On the other hand, if it is determined in step S402 that the total used amount is equal to or more than the threshold, the threshold excess processing unit 1011 executes the threshold excess processing (S406). Since the threshold excess processing in step S406 is the same as the threshold excess processing executed by the threshold excess processing unit 1011 as shown in FIG. 24, any detailed explanation thereof has been omitted.

(1-5) Advantageous Effects of this Embodiment

With the computer system 1 according to this embodiment described above, a threshold for the total used amount of virtual volumes in the storage apparatus 100 is set for each host computer 200 and virtual volumes created in the storage apparatus 100 are associated with the host computers 200 that can use the virtual volumes. Moreover, the used capacities of the host computers 200 capable of accessing the virtual volumes are managed and the total used capacity of the virtual volumes in the storage apparatus is calculated for each host computer 200. Furthermore, if the total used amount of the virtual volumes in the host computer 200 exceeds the set threshold, processing for reporting the threshold excess and limiting data writing is executed. As a result, it is possible to manage the capacity flexibly and easily according to the expansion or downsizing of company business by setting a value of the virtual volume size, which is a value considerably larger than an actual used capacity, as in the conventional art, and using a newly set threshold.

(2) Second Embodiment

Since a hardware configuration of a computer system 2 according to this embodiment is the same as that of the computer system 1 according to the first embodiment, any detailed explanation thereof has been omitted. This embodiment is common to the first embodiment in that a threshold for the total used amount of virtual volumes in the storage apparatus 100 is set for each host computer 200. However, although the user ID used for the quota control is identical to the ID of the host computer 200 according to the first embodiment, the difference between this embodiment and the first embodiment is that the user ID may be sometimes different from the ID of the host computer 200 in this embodiment.

Specifically speaking, a user ID is already set in this embodiment and the user ID which is set will be used. In this case, the user ID may be sometimes different from the ID of the host computer 200 and the ID column in the volume used capacity management table 1013 or the storage used capacity management table 1014 may store the ID of the host computer 200, which is set by the administrator, and/or the user ID. Accordingly, if the ID of the host computer 200 is different from the user ID to be used for quota management, integrated capacity management between files and blocks cannot be performed.

So, a user ID conversion table 1015 for associating the ID of the host computer 200 with the user ID is newly provided in this embodiment and the user ID is converted into the server ID. As a result, even if the user ID is already set before volume creation and the user ID is different from the ID of the host computer 200, it is possible to integrally manage the volume used capacity of the host computer 200.

The above-mentioned user ID conversion table 1015 is stored in the memory 12 for the storage apparatus 100. Specifically speaking, the user ID conversion table 1015 is configured in the storage used capacity management program 101 as shown in FIG. 27. The user ID conversion table 1015 is updated by the volume creation processing unit 1040 during the volume creation processing. Specifically speaking, during the volume creation processing, the volume creation processing unit 1040 updates the volume used capacity management table 1013 and registers the ID of the host computer 200, which is set to the volume used capacity management table 1013, the user ID, and an authentication server in the user ID conversion table 1015 by associating them with each other.

Now, the details of the user ID conversion table 1015 will be explained. As shown in FIG. 27, the user ID conversion table 1015 includes an ID column 10150, an authentication server column 10151, and a user ID column 10152. The ID column 10150 stores information for identifying the host computer 200 (such as the server ID). The authentication server column 10151 stores information for identifying an authentication server which authenticates the relevant host computer. The user ID column 10152 stores the user ID which is set by quota control. Accordingly, the user ID and the authentication server information are associated with each other and stored, so that the user ID can be distinguished when the same user ID is used by a different authentication server.

Furthermore, during the block access processing and the file access processing, the user ID is converted into the ID of the host computer 200 by referring to the volume used capacity management table 1013, and the storage used capacity management table 1013, and also referring to the user ID conversion table 1015. As a result, the volume used capacity can be calculated by using the ID of the host computer 200 during the block access processing and the file access processing, so that it is possible to integrally manage the volume used capacity.

Furthermore, the user ID and the ID of the host computer 200 are associated with each other by using the user ID conversion table 1015 according to this embodiment, but the method is not limited to this example. For example, a list of accounts for access to the file system may be displayed during the volume creation processing and the administrator may select the user ID from that list. Then, the user ID selected by the administrator is set to the volume used capacity management table 1013. As a result, the user ID can be directly set to the volume used capacity management table 1013 and it is possible to realize the configuration that does not require a table like the user ID conversion table 1015.

(3) Third Embodiment

In this embodiment, processing for migrating a storage apparatus according to the first embodiment and the second embodiment to a new storage apparatus will be explained. A data migration program (not shown in the drawings) according to this embodiment is stored in the memory 32 for the storage management server 300.

Regarding the storage apparatus data migration, data can be copied when the configuration of a migration source storage apparatus is the same as that of a migration destination storage apparatus. Since a file system is created in virtual volumes in the storage apparatus according to the first embodiment and the second embodiment, data can be copied when not only the configuration of the virtual volumes, but also the configuration of the file system created in the virtual volumes are the same in both the migration source storage apparatus and the destination storage apparatus. Specifically speaking, when the virtual volume size, the file system ID, the file system size, and the correspondence relationship between the virtual volumes and the file system are the same in both the migration source storage apparatus and the destination storage apparatus, data can be copied.

Examples of configuration information about the storage apparatus 100 include the volume used capacity management table 1013 and the storage used capacity management table 1014 described earlier. The data migration program for the storage apparatus 100 exports data stored in the volume used capacity management table 1013 and the storage used capacity management table 1014 to the migration destination storage apparatus.

Data migration from the migration source storage apparatus to the migration destination storage apparatus may be performed on a volume basis or all the volumes in the storage apparatus may be migrated collectively. When the data migration is executed on a volume basis, information corresponding to a migration target volume is obtained from the volume used capacity management table 1013 and the storage used capacity management table 1014 and that information is exported to the migration destination storage apparatus.

Figure 28:
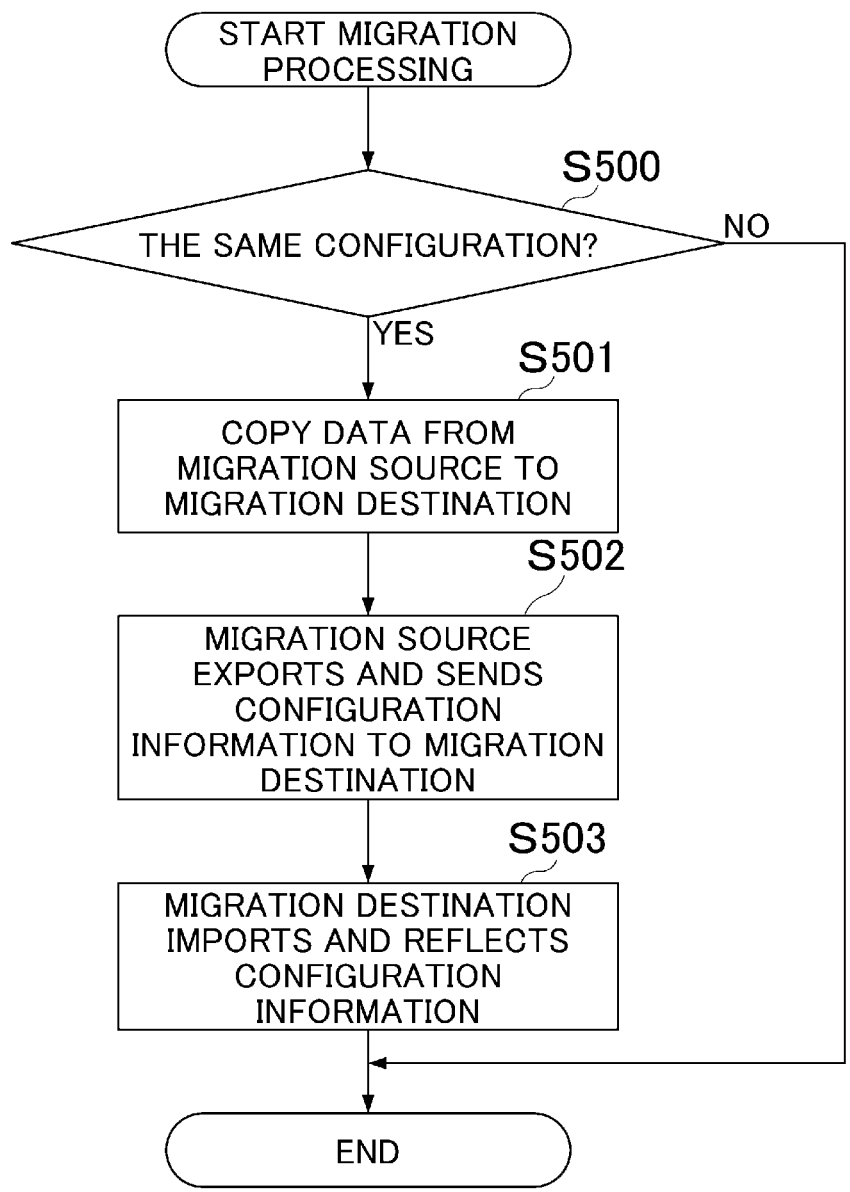
FIG. 28 is a flowchart illustrating a processing sequence for migration processing according to a third embodiment.

Now, the details of data migration processing by the data migration program will be explained. As shown in FIG. 28, the data migration program firstly judges whether or not the configuration of the migration source storage apparatus is the same as that of the migration destination storage apparatus (S500).

If it is determined in step S500 that the configuration of the migration source storage apparatus is the same as that of the migration destination storage apparatus, the data migration program copies data from the migration source storage apparatus to the migration destination storage apparatus (S501). Next, the data migration program for the migration source storage apparatus exports the configuration information in, for example, the volume used capacity management table 1013 and the storage used capacity management table 1014 and sends it to the migration destination storage apparatus. The migration destination storage apparatus then imports the configuration information, which was sent from the migration source storage apparatus in step S502, and reflects in, for example, the corresponding volume used capacity management table 1013 and storage used capacity management table 1014 (S503).

On the other hand, if it is determined in step S500 that the configuration of the migration source storage apparatus is not the same as that of the migration destination storage apparatus, data cannot be migrated, thereby terminating the data migration processing.

According to this embodiment, the configuration information in, for example, the volume used capacity management table 1013 and the storage used capacity management table 1014 is also exported together with the data during the storage apparatus data migration, so that with the migration destination storage apparatus as well, it is possible, as in the first embodiment or the second embodiment, to manage the capacity flexibly and easily according to the expansion or downsizing of company business by setting a value of the virtual volume size, which is a value considerably larger than an actual used capacity, as in the conventional art, and using a newly set threshold.

(4) Other Embodiments

Incidentally, with the aforementioned embodiments, the CPU 11 for the storage apparatus 100 implements various functions of, for example, the volume creation unit, the allocation unit, and the capacity management unit according to the present invention in accordance with the various programs stored in the storage apparatus 100, but the means of implementation of the various functions is not limited to this example. For example, the CPU 11 may be provided in another device separate from the storage apparatus 100 and the various functions may be implemented in cooperation with that CPU. Alternatively, the various programs stored in the storage apparatus 100 may be provided in another device separate from the storage apparatus 100 and the various functions may be invoked by the CPU 11 and thereby implemented.

REFERENCE SIGNS LIST

100 Storage apparatus
101 Storage used capacity management program
102 File system management program
103 Storage management program
104 Volume management program
105 Block access processing program
106 File system management program
107 SNMP agent program
108 Mail transmission program
1013 Volume used capacity management table
1014 Storage used capacity management table
200 Host computer
201 Block access interface
300 Storage management server
400 Network

The invention claimed is:

1. A storage apparatus coupled to a plurality of host computers, comprising:
a processor;
a plurality of storage resources configured to provide a storage pool;
a plurality of virtual volumes configured for block-based access by the plurality of host computers;
one or more file systems created on one or more of the plurality of virtual volumes configured to be accessed by at least one user over one or more of the plurality of host computers; and
a non-transitory memory configured to store:
a first table for recording a plurality of entries, each comprising an ID for one of the virtual volumes, an ID for one of the plurality of host computers which accessed the plurality of virtual volumes, and information on used capacity of a virtual volume used by the one of the plurality of host computers;
a second table for recording a plurality of entries for the host computers each of which comprises an ID for one of the plurality of host computers, information on total used capacity of the virtual volumes aggregated by the ID for the one of the plurality of host computers, and a threshold of capacity set for the one of the plurality of host computers,
wherein in response to creation of each of the one or more file systems, the processor is configured to specify one of the entries in the first table which includes an ID for the virtual volume where the file system is created, delete the entry, add one or more of entries corresponding to at least one user accessing the file system, and record an ID for one of the plurality of host computer which accesses the file system by the at least one users for the file system thereover,
wherein, the processor is configured to:
in response to a write request to a storage area of the one of the virtual volumes, allocate one or more of the storage resources from the storage pool to the storage area when the one or more storage resources has not been allocated to the storage area;
in response to a block-based write request to one of the virtual volumes from a first host computer of the host computers, specify the total used capacity and the threshold for the first host computer based on the first and second tables, determine whether the write data can be written or not based on amount of the write data, the total capacity and the threshold for the first computer, and update the used capacity and the total used capacity for the first host computer of the first and second tables by amount of write data of the block-based write request; and
in response to a file-based write request to one of the file systems, specify a second host computer of the host computers set for a file system to be accessed, specify the total used capacity and the threshold for the second host computer based on the first and second tables, determine whether the write data can be written or not based on the amount of the write data, the total capacity and the threshold for the second computer, and update the used capacity and the total used capacity for the second host computer of the first and the second tables by amount of write data of the file-based write request.

2. A storage apparatus according to claim 1, wherein, in response to the file-based write request, the processor is configured to:
subtract the total used capacity from the threshold for the second host computer;
set a value obtained by the subtraction to a quota threshold which is set to the file system to be accessed;
add the amount of write data of the file-based write request to the used capacity of the file system; and
write the write data of the file-based write request if value obtained by the addition is less than the quota threshold.

3. A storage system according to claim 2, further comprising:
a third table recording a plurality of entries each of which includes an ID for one of the at least one user and an ID for one of the plurality of host computers,
wherein, each of the entries of the first table includes an ID for one of the at least one user of one of the plurality of host computers instead of the ID for the host computer, and each of the entries of the second table includes an ID for one of the at least one user and an ID for one of the plurality of host computers instead of the ID for the host computer, wherein, the processor is further configured to convert the ID for the user to the ID for host computer based on the third table.

4. A storage management method, comprising:

storing, in non-transitory memory, a first table for recording a plurality of entries, each comprising:
- an ID for one of a plurality of virtual volumes configured to be accessed by a plurality of host computers;
- an ID for one of the plurality of host computers which accessed the plurality of virtual volumes; and
- information on used capacity of a virtual volume used by the one of the plurality of host computers;

storing, in the non-transitory memory, a second table for recording a plurality of entries for the host computers each of which comprises an ID for one of the plurality of host computers, information on total used capacity of the virtual volumes aggregated by the ID for the one of the plurality of host computers, and a threshold of capacity set for the one of the plurality of host computers, in response to creation of each of the one or more file systems, specifying one of the entries in the first table which includes an ID for the virtual volume where the file system is created, deleting the entry, adding one or more of entries corresponding to at least one user which accesses the file system by the at least one users for the file system thereover, in response to a write request to a storage area of the one of the virtual volumes, allocating, by a processor, one or more storage resources from a storage pool to the storage area when the one or more storage resources has not been allocated to the storage area;

in response to a block-based write request to one of the virtual volumes from a first host computer of the host computers, specifying the total used capacity and the threshold for the first host computer based on the first and second tables, determining whether the write data can be written or not based on amount of the write data, the total capacity and the threshold for the first computer, and updating, by the processor, the used capacity and the total used capacity for the first host computer of the first and second tables by amount of write data of the block-based write request; and in response to a file-based write request to one of the file systems, specifying a second host computer of the host computers set for the file system to be accessed, specifying the total used capacity and the threshold for the second host computer based on the first and second tables, determining whether the write data can be written or not based on the amount of the write data, the total capacity and the threshold for the second computer, and updating, by the processor, the used capacity and the total used capacity for the second host computer of the first and the second tables by amount of write data of the file-based write request.

5. The storage management method according to claim 4, further comprising:

in response to the file-based write request, the processor is configured to:
- subtract the total used capacity from the threshold for the second host computer;
- set a value obtained by the subtraction to a quota threshold which is set to the file system to be accessed;
- add the amount of write data of the file-based write request to the used capacity of the file system; and
- write the write data of the file-based write request if value obtained by the addition is less than the quota threshold.

6. The storage management method according to claim 5, further comprising:

recording, in a third table, a plurality of entries each of which includes an ID for one of the at least one user and an ID for one of the plurality of host computers, wherein, each of the entries of the first table includes an ID for one of the at least one user of one of the plurality of host computers instead of the ID for the host computer, and each of the entries of the second table includes an ID for one of the at least one user and an ID for one of the plurality of host computers instead of the ID for the host computer; and converting, by the processor, the ID for the user to the ID for host computer based on the third table.

\* \* \* \* \*